United States Patent [19]

Ishiwata

[11] Patent Number: 4,902,113

[45] Date of Patent: Feb. 20, 1990

[54] OBJECTIVE LENS AND IMAGING OPTICAL SYSTEM FOR OPTICAL INFORMATION RECORDING AND READOUT DEVICE

[75] Inventor: Hiroshi Ishiwata, Kanagawa, Japan

[73] Assignee: Olympus Optical Co., Ltd., Tokyo, Japan

[21] Appl. No.: 320,571

[22] Filed: Mar. 8, 1989

[30] Foreign Application Priority Data

Mar. 8, 1988 [JP] Japan .................................. 63-52749
Mar. 18, 1988 [JP] Japan .................................. 63-63617

[51] Int. Cl.$^4$ .............................................. G02B 13/18
[52] U.S. Cl. ...................................... 350/432; 350/413
[58] Field of Search ................................ 350/432, 413

[56] References Cited

U.S. PATENT DOCUMENTS 4,571,034 2/1986 Nakamura ........................... 350/432
4,772,105 9/1988 Takada ................................ 350/413

FOREIGN PATENT DOCUMENTS 57-76512 5/1982 Japan .
59-23313 2/1984 Japan .
59-26717 2/1984 Japan .
61-56314 3/1986 Japan .
62-43842 2/1987 Japan .

Primary Examiner—Bruce Y. Arnold
Assistant Examiner—Rebecca D. Gass
Attorney, Agent, or Firm—Cushman, Darby & Cushman

[57] ABSTRACT

A compact, large-aperture objective lens for the optical memory designed as a single-element lens having aspherical surfaces on both the sides thereof and favorably corrected aberrations, and an imaging optical system having a simple composition consisting of a collimator lens designed as a single-element lens having spherical surfaces and an objective lens movable along the optical axis, and so adapted as to allow very little degradation of performance when the objective lens is shifted.

4 Claims, 25 Drawing Sheets

FIG. 49

OBJECTIVE LENS AND IMAGING OPTICAL SYSTEM FOR OPTICAL INFORMATION RECORDING AND READOUT DEVICE

BACKGROUND OF THE INVENTION (a) Field of the Invention

The present invention relates to a compact, large-aperture objective lens and a compact imaging optical system to be used in the optical information recording and readout device.

(b) Description of the Prior Art

The optical system used in the optical information recording and readout device (hereinafter referred to as the optical memory device) has such a composition as shown in FIG. 1. Speaking concretely of the component members with reference to FIG. 1, the reference numeral 1 represents an information recording medium such as an optical disk, the reference numeral 2 designates an objective lens, the reference numeral 3 denotes a collimator lens and the reference numeral 4 represents a light source. The imaging optical system for the optical memory device having the composition described above is used for making parallel the rays emitted from the light source with the collimator lens and focusing the rays onto the information recording surface of the information recording medium 1 with the objective lens 2.

A condenser lens (objective lens) to be used in this optical system should desirably have not only favorable imaging performance but also a compact, light-weight design since it must be shifted speedily for automatic focusing and tracking.

As objective lenses for the optical memory device each consisting of a single-element lens having aspherical surface, there are known the objective lenses disclosed by Japanese Unexamined Published Patent Application Nos. 76512/57, 23313/59 and 26717/59. These objective lenses make it possible to design compact, light-weight optical memory devices manufacturable at low costs.

In order to make an objective lens for optical memory device smaller, it is necessary to minimize the entrance pupil of the lens. The entrance pupil of a lens is given as a product of the focal length multiplied by the numerical aperture thereof and, it is necessary to shorten focal length for making compacter the objective lens for optical memory device since it has a numerical aperture larger than 0.45.

Out of the conventional examples mentioned above, the objective lens disclosed by Japanese Unexamined Published Patent Application No. 76512/57 has a large lean thickness d and a ratio d/f on the order of 0.7 between the thickness and focal length thereof. Accordingly, the working distance of the objective lens is shortened when the focal length thereof is shortened.

Further, aberrations are not corrected sufficiently favorably in the objective lens disclosed by Japanese Unexamined Published Patent Application No. 26717/59.

Furthermore, the objective lens disclosed by Japanese Unexamined Published Patent Application No. 56314/61 is a finite optical system (an optical system focusing an image of a light source on a disk located at a finite distance) and permits omitting the collimator lens in the imaging optical system for the optical memory device. Therefore, the objective lens makes it possible to simplify the composition of the imaging optical system as a whole and reduce manufacturing cost thereof. However, since the objective lens is a finite optical system, it has a defect that it causes variation of magnification and degradation of imaging performance when the lens follows fluctuations of the optical disk and so on. In order to correct this defect, it is necessary to reserve a long distance between a semiconductor laser source and a disk, thereby enlarging the optical memory device and lowering the ratio of the rays effectively used for imaging out of the rays omitted from the laser source (utilization efficiency of laser).

Moreover, as conventional examples of the optical systems for the optical memory device, there are known the optical systems disclosed by Japanese Unexamined Published Patent Application No. 43842/62.

The latter optical system is so adapted as to permit enhancing utilization efficiency of laser and reducing the degradation of performance caused when the objective lens is shifted in the direction along the optical axis and the tracking direction by interposing a coupling lens between a semiconductor laser source and the objective lens. However, since the objective lens is a finite system, the objective lens has an effective aperture $(1+\beta)$ times as large as that of an objective lens of the infinite system for obtaining the same numerical aperture ($\beta$ represents imaging magnification of the imaging optical system), thereby enlarging diameter of the lens and making it impossible to make compact the optical memory device. Further, the reduction of performance degradation is not sufficient. Especially, performance is remarkably degraded by shifting the objective lens in the direction along the optical axis.

SUMMARY OF THE INVENTION

A primary object of the present invention is to provide a compact objective lens for the optical memory device which has a large numerical aperture, a sufficiently long working distance and favorably corrected aberrations.

Another object of the present invention is to provide an imaging optical system for the optical memory device whose performance is degraded little by shifting the objective lens in the direction along the optical axis and the tracking direction, and which permits designing a compact light-weight optical memory device and reducing manufacturing cost thereof.

The objective lens according to the present invention has the composition shown in FIG. 2, i.e., consists of a single-element lens having a first surface and a second surface designed as aspherical surfaces having positive refractive powers and arranged in the order from the light source. When the direction along the optical axis is taken as the x axis, the direction perpendicular to the optical axis is taken as the y axis and radius of curvature on the vertex of the aspherical surface is represented by r, shapes of these aspherical surfaces are expressed by the following formula:

$$x = \frac{y^2/r}{1 + \sqrt{1 - P(y/r)^2}} + \sum_{i=1}^{} A_{2i} y^{2i}$$

wherein the reference symbol p represents the conic constant and the reference symbol $A_{2i}$ designates the coefficient of aspherical surface of the 2i'th order.

Further, the objective lens according to the present invention is characterized in that it satisfies the following conditions (1) through (4):

(1) $n < 1.65$
(2) $0.25 < d/nf < 0.4$
(3) $-0.5 < P_1 < 0.5$
(4) $P_2 < -20$ wherein the reference symbol n represents refractive index of the objective lens, the reference symbol f designates focal length of the objective lens, the reference symbol d denotes thickness of the objective lens, and the reference symbols $P_1$ and $P_2$ represent the conic constants of the first surface and the second surface respectively.

By selecting the parameters n, d and f so as to satisfy the above-mentioned conditions (1) and (2), the present invention has succeeded is designing a compact objective lens which has a large numerical aperture and a sufficient working distance, and is suited for use in the optical memory device.

Further, by designing the objective lens so as to satisfy the conditions (3) and (4), the present invention has succeeded in favorably correcting spherical aberration and the sine condition simply by using, as the first surface, an aspherical surface expressed by the terms up to the tenth power at most in the formula of aspherical surface and, as the second surface, an aspherical surface expressed by the terms up to the sixth power at most in the formula of aspherical surface. In addition, degradation of performance due to eccentricity of the first and second surfaces is also minimized.

If refractive index n of the lens is larger than 1.65 defined as the upper limit of the condition (1), refractive power is unbalanced between the first surface and the second surface by correcting the sine condition, or the first surface has too high power, thereby producing remarkable astigmatism and degrading offaxial performance.

Also in a case where d/nf is smaller than 0.25 defined as the lower limit of the condition (2), astigmatism will be aggravated and the offaxial performance will be degraded. If d/nf is larger than 0.4 defined as the upper limit of the condition (2), astigmatism will be produced little but focal length must be prolonged to reserve a sufficient working distance, thereby making it impossible to design a compact objective lens.

If the upper limit (0.5) or the lower limit (−0.5) of the condition (3) is exceeded, it will be difficult to correct the spherical aberration and the sine condition at the same time. Further, if an attempt is made to correct the above-mentioned aberrations using a surface expressed by the terms of higher order in the formula of aspherical surface, the first or second aspherical surface will have a shape having a point of inflection which can hardly be obtained by machining.

If $P_2$ exceeds −20 defined as the upper limit of the condition (4), it will be necessary for correcting the spherical aberration and the sine condition to use an aspherical surface having the terms of higher orders which can hardly be obtained by machining.

In order to minimize the degradation of performance due to eccentricity of the first and second surfaces and prevent the aspherical surfaces from having complicated shapes, it is more desirable that $P_2$ satisfies the following condition:

$-40 < P_2 < -23$

In the next place, the imaging optical system for the optical memory device according to the present invention has the composition illustrated in FIG. 3, i.e., comprises a collimator lens designed as a simple-element lens having spherical surfaces and an objective lens which are arranged in the order from the side of the light source. The imaging optical system for the optical memory device according to the present invention is characterized in that it satisfies the following conditions (5) and (6), and at least the objective lens is movable along the optical axis:

(5) $3 \leq a \leq 4.1$
(6) $15 \leq f_c \leq 24$ wherein the reference symbol a represents diameter of the entrance pupil of the objective lens and the reference symbol $f_c$ designates focal length of the collimator lens.

The imaging optical system according to the present invention uses, as the collimator lens, a plano-convex lens having a focal length satisfying the above-mentioned condition (6). Further, the objective lens is so designed as to satisfy the condition (5) to make it possible to prevent performance of the imaging optical system from being degraded by shifting the objective lens in the direction along the optical axis, minimize degradation of the performance by shifting the objective lens in the tracking direction and manufacture the imaging optical system at low cost.

If the lower limit of the condition (5) is exceeded in the state where the semiconductor laser source, the collimator lens and the objective lens have the common optical axis (hereinafter referred to as the neutral state), the objective lens will have a focal length shorter than 3 mm, thereby making it impossible to reserve a working distance required for the optical memory device. If the upper limit of the condition (5) is exceeded, the objective lens will be enlarged, and the members for driving the objective lens in the direction along the optical axis and the tracking direction will also be enlarged, thereby making it difficult to design a compact optical memory device.

As is already disclosed by Japanese Unexamined Published Patent Application No. 43842/62, a single-element lens having spherical surfaces can be regarded as an aplanatic lens when it has a long focal length and a large numerical aperture. However, such a lens inevitably enlarges optical memory device and lowers utilization efficiency of laser, thereby making it necessary to use a high-output laser source or increasing manufacturing cost of the optical memory device.

In order to obtain sufficiently high utilization efficiency for the ordinary laser source, numerical aperture on the side of the collimator lens must be larger than 0.08 in the neutral state.

When the objective lens satisfies the condition (5), focal length $f_c$ of the collimator lens must have a value not exceeding the upper limit of the condition (6), i.e., must not be longer than 24 mm. If the upper limit of the condition (6) is exceeded, utilization efficiency of laser will undesirably be lowered.

Further, as focal length of the collimator lens is shortened, utilization efficiency of laser is enhanced but the spherical aberration produced by the collimator lens is aggravated, thereby lowering the imaging performance of the imaging optical system. Especially when the objective lens is shifted in the tracking direction from the neutral state and the optical axis of the collimator lens is deviated accordingly from that of the objective lens, the light having passed through the objective lens has coma and the imaging performance is degraded under the influence due to the spherical aberration produced by the collimator lens.

In general optical systems for the optical memory device which are designed for a shift distance of 0.5 mm in the tracking direction, the wave front aberration should desirably be less than 0.07λ rms (root mean square) but exceeds 0.05λ rms in practical use. FIG. 4 shows a graph illustrating relationship between the tracking shift distance and wave front aberration at various focal lengths $f_c$ of the collimator lens. This graph gives $f_c > 15$ mm. That is to say, it is necessary to determine a lower limit of $f_c$ as defined by the condition (6). If $f_c$ is smaller than 15 defined as the lower limit of the condition (6), the spherical aberration produced by the collimator lens will be aggravated and the imaging performance will be degraded by coma, etc. produced in the light having passed through the objective lens under the influence due to the aggravation of spherical aberration.

Since the imaging optical system according to the present invention uses the collimator lens designed as the single-element lens having spherical surfaces, it can be manufactured at a cost lower than those of the imaging optical systems using a plural number of lenses or an aspherical lens. In order to further reduce manufacturing cost, it is desirable to adopt a single-element plano-convex lens having spherical surfaces.

In order to enhance optical performance, it is desirable to arrange the semiconductor laser surface at a location farther from the focal point of the collimator lens.

In the imaging optical system according to the present invention, the objective lens may be designed as a lens having aspherical surfaces on both the sides thereof as described above, a lens having an aspherical surface on either side only or a graded refractive index lens so far as it satisfies the condition (5).

BRIEF DESCRIPTION OF THE DRAWINGS

Figure 49:
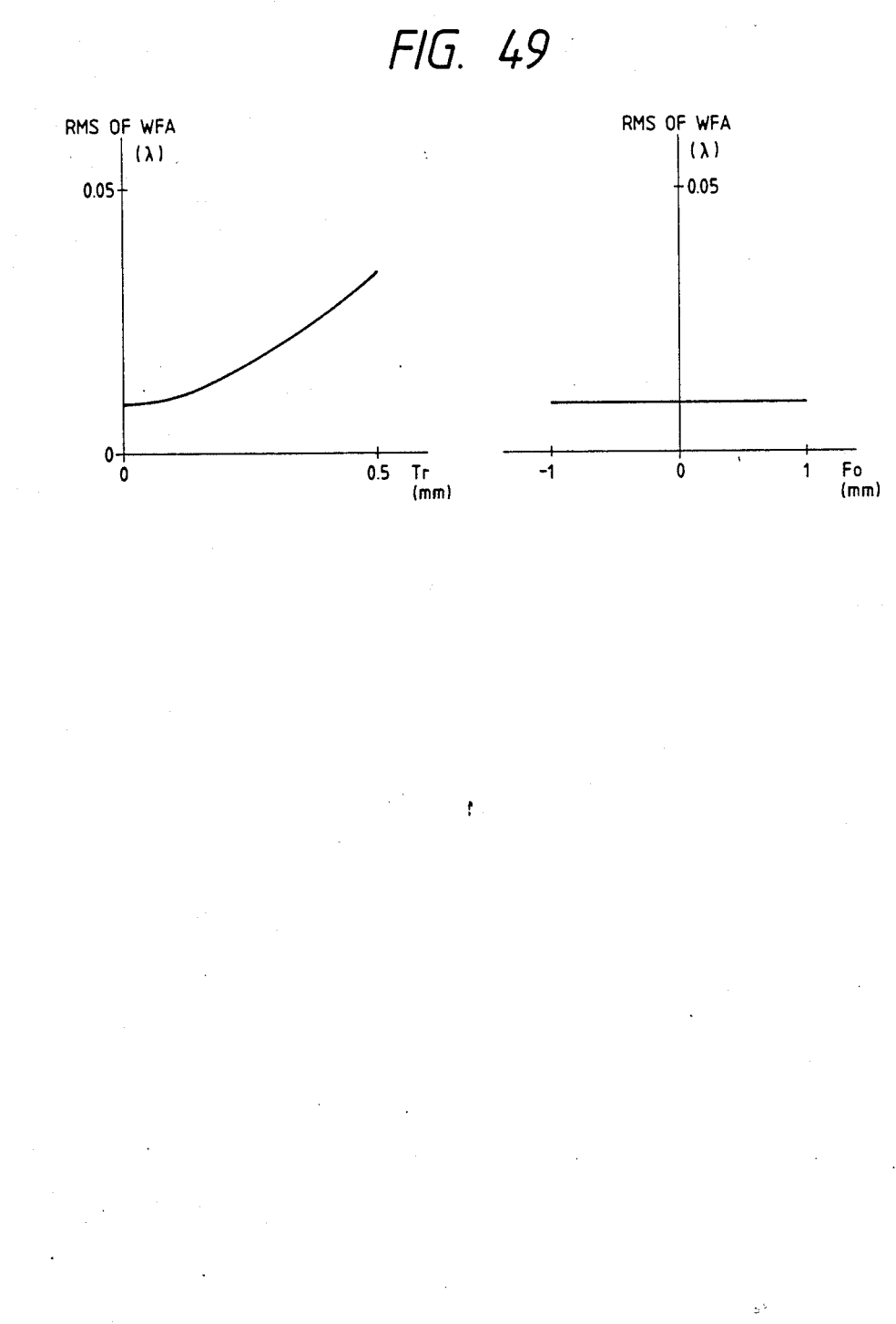

FIG. 40 through FIG. 49 show graphs illustrating the wave front aberration in the Embodiments 16 through 25 of the present invention.

DETAILED DESCRIPTION OF THE PREFERRED EMBODIMENTS

Now, preferred embodiments of the present invention will be detailedly described below.

Figure 1:
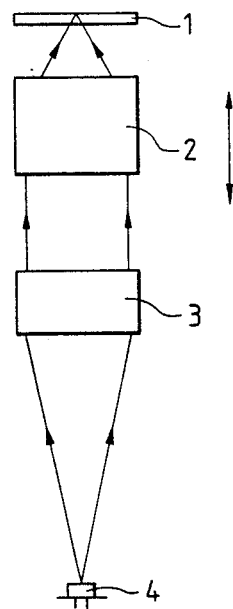
FIG. 1 shows a sectional view illustrating the composition of the conventional imaging optical system for the optical memory device.
Figure 2:
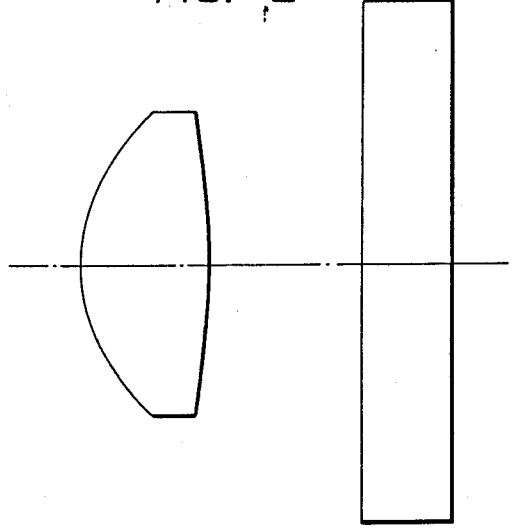
FIG. 2 shows a sectional view illustrating composition of the objective lens for the optical memory device according to the present invention.

First, each embodiment of the objective lens for the optical memory device according to the present invention has the composition illustrated in FIG. 2 and the following numerical data:

---
Embodiment 1

$f = 3.70$, NA $= 0.47$, WD $= 1.94$
$t = 1.2$, $n_c = 1.553$
$r_1 = 2.216$
$\quad\quad\quad d = 1.80 \quad\quad n = 1.48638$
$r_2 = -7.087$
aspherical coefficient
1st surface $\quad p_1 = 0.2095$, $A_4 = 0.26073 \times 10^{-2}$
$\quad\quad\quad\quad A_6 = 0.26872 \times 10^{-4}$, $A_8 = -0.21224 \times 10^{-5}$
2nd surface $\quad p_2 = -24.0$, $A_4 = 0.1288 \times 10^{-3}$
$d/nf = 0.3273$ ---
Embodiment 2

$f = 3.50$, NA $= 0.50$, WD $= 1.75$
$t = 1.2$, $n_c = 1.553$
$r_1 = 2.102$
$\quad\quad\quad d = 1.80 \quad\quad n = 1.48638$
$r_2 = -6.443$
aspherical coefficient
1st surface $\quad p_1 = 0.1962$, $A_4 = 0.35833 \times 10^{-2}$
$\quad\quad\quad\quad A_6 = 0.26837 \times 10^{-4}$, $A_8 = -0.21224 \times 10^{-5}$
2nd surface $\quad p_2 = -25.866$
$d/nf = 0.3460$ ---
Embodiment 3

$f = 3.89$, NA $= 0.45$, WD $= 2.13$
$t = 1.2$, $n_c = 1.553$
$r_1 = 2.3161$
$\quad\quad\quad d = 1.80 \quad\quad n = 1.48638$
$r_2 = -7.7048$
aspherical coefficient
1st surface $\quad p_1 = 0.1326$, $A_4 = 0.30826 \times 10^{-2}$
$\quad\quad\quad\quad A_6 = 0.3698 \times 10^{-4}$, $A_8 = -0.21226 \times 10^{-5}$
2nd surface $\quad p_2 = -26.099$
$d/nf = 0.3113$ ---
Embodiment 4

$f = 3.70$, NA $= 0.45$, WD $= 1.94$
$t = 1.2$, $n_c = 1.553$
$r_1 = 2.2117$

-continued $r_2 = -7.086$
$d = 1.80 \quad n = 1.48638$
aspherical coefficient
1st surface $\quad p_1 = 0.1575, A_4 = 0.33852 \times 10^{-2}$
$\quad A_6 = 0.36976 \times 10^{-4}, A_8 = -0.21226 \times 10^{-5}$
2nd surface $\quad p_2 = -26.0988$
$d/nf = 0.3273$

Embodiment 5
$f = 3.65, NA = 0.45, WD = 1.95$
$t = 1.2, n_c = 1.553$
$r_1 = 2.180$
$d = 1.70 \quad n = 1.48638$
$r_2 = -7.1228$
aspherical coefficient
1st surface $\quad p_1 = -0.314, A_4 = 0.91974 \times 10^{-2}$
$\quad A_6 = -0.3644 \times 10^{-4}, A_8 = -0.21219 \times 10^{-5}$
2nd surface $\quad p_2 = -26.1584, A_4 = 0.79594 \times 10^{-5}$
$d/nf = 0.3133$

Embodiment 6
$f = 3.70, NA = 0.45, WD = 2.05$
$t = 1.2, n_c = 1.553$
$r_1 = 2.1978$
$d = 1.60 \quad n = 1.48638$
$r_2 = -7.5662$
aspherical coefficient
1st surface $\quad p_1 = 0.1781, A_4 = 0.32654 \times 10^{-2}$
$\quad A_6 = 0.28249 \times 10^{-4}, A_8 = -0.21224 \times 10^{-5}$
2nd surface $\quad p_2 = -28.6371$
$d/nf = 0.2909$

Embodiment 7
$f = 3.70, NA = 0.45, WD = 2.04$
$t = 1.2, n_c = 1.553$
$r_1 = 2.4103$
$d = 1.60 \quad n = 1.56940$
$r_2 = -12.6998$
aspherical coefficient
1st surface $\quad p_1 = 0.0925, A_4 = 0.25544 \times 10^{-2}$
$\quad A_6 = 0.26296 \times 10^{-4}, A_8 = -0.21224 \times 10^{-5}$
2nd surface $\quad p_2 = -27.7044, A_4 = 0.39632 \times 10^{-3}$
$d/nf = 0.2755$

Embodiment 8
$f = 3.89, NA = 0.45, WD = 2.12$
$t = 1.2, n_c = 1.553$
$r_1 = 2.5449$
$d = 1.80 \quad n = 1.56940$
$r_2 = -12.7013$
aspherical coefficient
1st surface $\quad p_1 = 0.0576, A_4 = 0.23893 \times 10^{-2}$
$\quad A_6 = 0.13878 \times 10^{-4}, A_8 = -0.21227 \times 10^{-5}$
2nd surface $\quad p_2 = -25.8660, A_4 = 0.29117 \times 10^{-3}$
$d/nf = 0.2948$

Embodiment 9
$f = 3.50, NA = 0.50, WD = 1.62$
$t = 1.25, n_c = 1.489$
$r_1 = 2.3077$
$d = 1.90 \quad n = 1.56940$
$r_2 = -10.2438$
aspherical coefficient
1st surface $\quad p_1 = -0.250, A_4 = 0.69697 \times 10^{-2}$
$\quad A_6 = 0.52922 \times 10^{-4}, A_8 = -0.21239 \times 10^{-5}$
2nd surface $\quad p_2 = -36.2009, A_4 = 0.10273 \times 10^{-2}$
$\quad A_6 = -0.89914 \times 10^{-4}$
$d/nf = 0.3459$

Embodiment 10
$f = 3.50, NA = 0.53, WD = 1.62$
$t = 1.25, n_c STET = 1.489$
$r_1 = 1.3072$
$d = 1.90 \quad n = 1.56940$
$r_2 = -10.2588$
aspherical coefficient
1st surface $\quad p_1 = 0.1908, A_4 = 0.24244 \times 10^{-2}$
$\quad A_6 = 0.77425 \times 10^{-4}, A_8 = -0.21239 \times 10^{-5}$
2nd surface $\quad p_2 = -33.1505, A_4 = 0.11199 \times 10^{-2}$
$\quad A_6 = -0.75321 \times 10^{-4}$
$d/nf = 0.3459$

Embodiment 11
$f = 3.50, NA = 0.53, WD = 1.67$
$t = 1.20, n_c = 1.553$
$r_1 = 2.1095$
$d = 1.95 \quad n = 1.48638$
$r_2 = -6.1512$
aspherical coefficient
1st surface $\quad p_1 = -0.2913, A_4 = 0.95343 \times 10^{-2}$
$\quad A_6 = -0.26221 \times 10^{-4}, A_8 = -0.21217 \times 10^{-5}$
2nd surface $\quad p_2 = -20.715, A_4 = 0.4207 \times 10^{-4}$
$\quad A_6 = 0.14665 \times 10^{-4}$
$d/nf = 0.3748$

Embodiment 12
$f = 3.60, NA = 0.50, WD = 1.82$
$t = 1.2, n_c = 1.553$
$r_1 = 2.5025$
$d = 1.80 \quad n = 1.63552$
$r_2 = -19.2179$
aspherical coefficient
1st surface $\quad p_1 = -0.2526, A_4 = 0.55456 \times 10^{-2}$
$\quad A_6 = 0.33298 \times 10^{-4}, A_8 = -0.21245 \times 10^{-5}$
2nd surface $\quad p_2 = -28.1238, A_4 = 0.16495 \times 10^{-2}$
$\quad A_6 = -0.14757 \times 10^{-3}$
$d/nf = 0.3057$

Embodiment 13
$f = 3.50, NA = 0.50, WD = 1.73$
$t = 1.2, n_c = 1.553$
$r_1 = 2.4512$
$d = 1.80 \quad n = 1.63552$
$r_2 = -17.1774$
aspherical coefficient
1st surface $\quad p_1 = -0.1165, A_4 = 0.44014 \times 10^{-2}$
$\quad A_6 = 0.17499 \times 10^{-4}, A_8 = -0.21224 \times 10^{-5}$
2nd surface $\quad p_2 = -26.0737, A_4 = 0.66776 \times 10^{-3}$

Embodiment 14
$f = 3.89, NA = 0.45, WD = 2.13$
$t = 1.2, n_c = 1.553$
$r_1 = 2.3108$
$d = 1.8 \quad n = 1.48638$
$r_2 = -7.785$
aspherical coefficient
1st surface $\quad p_1 = 0.3498, A_4 = 0.63894 \times 10^{-2}$
$\quad A_6 = 0.21406 \times 10^{-6}, A_8 = -0.21221 \times 10^{-5}$
2nd surface $\quad p_2 = -25.8111, A_4 = 0.63894 \times 10^{-3}$
$\quad A_6 = -0.50155 \times 10^{-5}, d/nf = 0.3113$

Embodiment 15
$f = 3.60, NA = 0.45, WD = 1.845$
$t = 1.2, n_c = 1.553$
$r_1 = 2.1799$
$d = 1.80 \quad n = 1.49379$
$r_2 = -7.0033$
aspherical coefficient
1st surface $\quad p_1 = 0.0982, A_4 = 0.4468 \times 10^{-2}$
$\quad A_6 = 0.65331 \times 10^{-4}, A_8 = -0.21231 \times 10^{-5}$
2nd surface $\quad p_2 = -28.8561$
$d/nf = 0.3347$ wherein the reference symbol NA represents numerical aperture of the objective lens, the reference symbol WD designates working distance of the objective lens, the reference symbols $r_1$ and $r_2$ denote radii of curvature on the vertices of the first surface and the second surface respectively of the objective lens, the reference symbol d represents thickness of the objective lens, the reference symbol n designates refractive index of the objective lens, the reference symbol t denotes thickness of an optical recording medium such as an optical disk and the reference symbol $n_c$ represents refractive index of the optical recording medium.

The Embodiment 1 through 15 have the composition shown in FIG. 2 and the aberration characteristics illustrated in FIG. 5 through FIG. 19 respectively.

Figure 20:
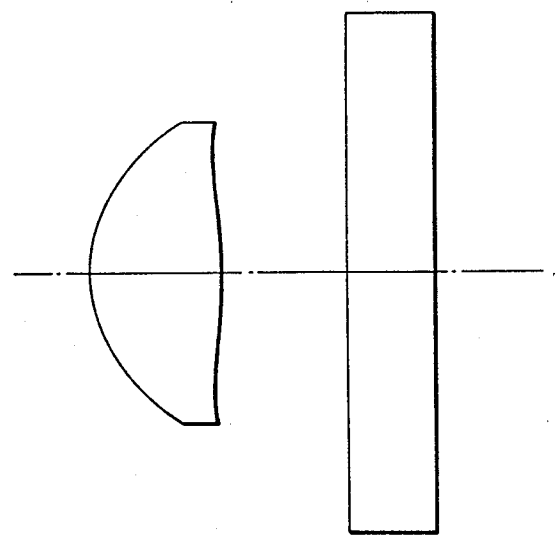
FIG. 20 shows a sectional view illustrating a reference example of the objective lens for the optical memory device.
Figure 21:
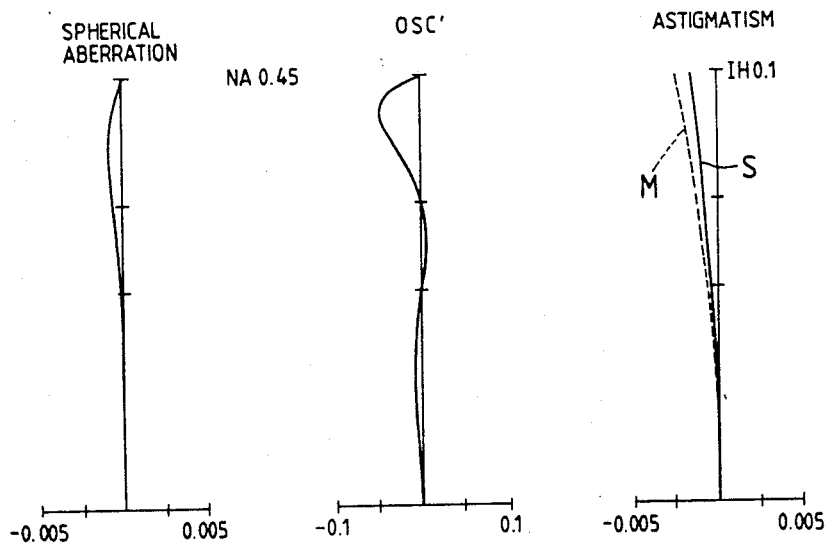
FIG. 21 shows curves illustrating aberration characteristics of the above-mentioned reference example.

As a reference example, description will be made on an objective lens having the composition shown in FIG. 20 and the following numerical data:

$f = 3.50$, NA = 0.50, WD = 1.73
$t = 1.2$, $n_c = 1.553$
$r_1 = 2.0662$
$\quad d = 1.80 \quad n = 1.48638$
$r_2 = -6.911$
aspherical coefficient
1st surface $\quad p_1 = 0.80$, $A_4 = -0.39177 \times 10^{-2}$
$\quad A_6 = -0.77017 \times 10^{-3}$, $A_8 = -0.34256 \times 10^{-5}$
2nd surface $\quad p_2 = -38.3101$, $A_4 = -0.60961 \times 10^{-4}$
$\quad A_6 = 0.17031 \times 10^{-2}$
$d/nf = 0.3460$ This objective lens does not satisfy the conditions (3) and (4) defined by the present invention. Accordingly, the aspherical surface of this objective lens has a point of inflection and is obtainable very hardly by machining though it has favorable imaging performance as shown in FIG. 21.

Now, the preferred embodiments of the imaging optical system for optical memory device will be described below:

Embodiment 16
$f_0 = 3.30$, $f_c = 18.0$, $a = 3.0$, $d_0 = 17.2$
$r_1 = \infty$
$\quad d_1 = 2.0 \quad n_1 = 1.82484$
$r_2 = -14.8471$
$\quad d_2 = 5.0$
$r_3 = 1.9845$ (aspherical surface)
$\quad d_3 = 1.6 \quad n_2 = 1.48638$
$r_4 = -6.1801$ (aspherical surface)
$\quad d_4 = 1.647$
$r_5 = \infty$
$\quad d_5 = 1.2 \quad n_3 = 1.55322$
$r_6 = \infty$
aspherical coefficient
3rd surface $\quad P = 0.1953$, $A_4 = 0.45892 \times 10^{-2}$
$\quad A_6 = 0.28751 \times 10^{-4}$, $A_8 = -0.21224 \times 10^{-5}$
4th surface $\quad P = -27.6399$

Embodiment 17
$f_0 = 3.60$, $f_c = 22.0$, $a = 3.60$, $d_0 = 21.0$
$r_1 = \infty$
$\quad d_1 = 2.0 \quad n_1 = 1.67496$
$r_2 = -14.8491$
$\quad d_2 = 5.0$
$r_3 = 2.8285$ (aspherical surface)
$\quad d_3 = 2.0 \quad n_2 = 1.78569$
$r_4 = \infty$
$\quad d_4 = 1.635$
$r_5 = \infty$
$\quad d_5 = 1.25 \quad n_3 = 1.48860$
$r_6 = \infty$
aspherical coefficient
3rd surface $\quad P = 0.637$, $A_4 = -0.90314 \times 10^{-3}$
$\quad A_6 = -0.10820 \times 10^{-3}$, $A_8 = -0.87636 \times 10^{-5}$
$\quad A_{10} = -0.72049 \times 10^{-6}$

Embodiment 18
$f_0 = 3.65$, $f_c = 16.0$, $a = 3.30$, $d_0 = 15.2$
$r_1 = \infty$
$\quad d_1 = 2.0 \quad n_1 = 1.86888$
$r_2 = -13.9021$
$\quad d_2 = 5.0$
$r_3 = 2.180$ (aspherical surface)
$\quad d_3 = 1.70 \quad n_2 = 1.48638$
$r_4 = -7.1228$ (aspherical surface)
$\quad d_4 = 1.932$
$r_5 = \infty$
$\quad d_5 = 1.20 \quad n_3 = 1.55322$
$r_6 = \infty$
aspherical coefficient
3rd surface $\quad P = -0.314$, $A_4 = 0.91974 \times 10^{-2}$
$\quad A_6 = -0.3644 \times 10^{-4}$, $A_8 = -0.21219 \times 10^{-5}$
4th surface $\quad P = -26.1584$, $A_4 = 0.79594 \times 10^{-5}$

Embodiment 19
$f_0 = 3.85$, $f_c = 23.0$, $a = 4.08$, $d_0 = 22.2$
$r_1 = \infty$
$\quad d_1 = 2.0 \quad n_1 = 1.86888$
$r_2 = -19.9842$
$\quad d_2 = 5.0$
$r_3 = 2.3055$ (aspherical surface)
$\quad d_3 = 2.1 \quad n_2 = 1.48638$
$r_4 = -6.9992$ (aspherical surface)
$\quad d_4 = 1.922$
$r_5 = \infty$
$\quad d_5 = 1.2 \quad n_3 = 1.55322$
$r_6 = \infty$
aspherical coefficient
3rd surface $\quad P = 0.2049$, $A_4 = 0.25766 \times 10^{-2}$
$\quad A_6 = 0.26893 \times 10^{-4}$, $A_8 = -0.21224 \times 10^{-5}$
4th surface $\quad P = -25.8695$, $A_4 = 0.68599 \times 10^{-4}$

Embodiment 20
$f_0 = 3.64$, $f_c = 20.04$, $a = 3.4$, $d_0 = 19.3$
$r_1 = \infty$
$\quad d_1 = 2.0 \quad n_1 = 1.82484$
$r_2 = -16.527$
$\quad d_2 = 5.0$
$r_3 = 2.801$
$\quad d_3 = 1.5 \quad n_2 = 1.6388$ (graded refractive index lens)
$r_4 = \infty$
$\quad d_4 = 2.017$
$r_5 = \infty$
$\quad d_5 = 1.2 \quad n_3 = 1.55322$
$r_6 = \infty$
refractive index distribution
$n_0 = 1.6388 \quad g = 0.14586 \quad h_4 = -0.39495$
$h_6 = -0.318903 \quad h_8 = 0.48172$

Embodiment 21
$f_0 = 3.58$, $f_c = 20.04$, $a = 3.8$, $d_0 = 19.3$
$r_1 = \infty$
$\quad d_1 = 2.0 \quad n_1 = 1.82484$
$r_2 = -16.527$
$\quad d_2 = 5.0$
$r_3 = 2.7628$ (aspherical surface)
$\quad d_3 = 1.8 \quad n_2 = 1.78569$
$r_4 = 111.0003$
$\quad d_4 = 1.703$
$r_5 = \infty$
$\quad d_5 = 1.25 \quad n_3 = 1.48860$
$r_6 = \infty$
aspherical coefficient
3rd surface $\quad P = 0.5508$, $A_4 = -0.35704 \times 10^{-3}$
$\quad A_6 = -0.69842 \times 10^{-4}$, $A_8 = -0.48187 \times 10^{-5}$
$\quad A_{10} = -0.72053 \times 10^{-6}$

Embodiment 22
$f_0 = 3.80$, $f_c = 19.0$, $a = 3.8$, $d_0 = 18.0$
$r_1 = \infty$
$\quad d_1 = 3.0 \quad n_1 = 1.86888$
$r_2 = -16.5087$
$\quad d_2 = 5.0$
$r_3 = 2.7548$ (aspherical surface)
$\quad d_3 = 2.0 \quad n_2 = 1.67496$
$r_4 = -26.3183$
$\quad d_4 = 1.892$
$r_5 = \infty$
$\quad d_5 = 1.2 \quad n_3 = 1.55322$
$r_6 = \infty$
aspherical coefficient
3rd surface $\quad P = 0.2963$, $A_4 = 0.54062 \times 10^{-3}$
$\quad A_6 = -0.48084 \times 10^{-4}$, $A_8 = -0.48191 \times 10^{-5}$
$\quad A_{10} = -0.72053 \times 10^{-6}$

Embodiment 23
$f_0 = 3.70$, $f_c = 20.0$, $a = 3.34$, $d_0 = 19.2$
$r_1 = -199.5935$
$\quad d_1 = 2.0 \quad n_1 = 1.82484$
$r_2 = -15.3064$
$\quad d_2 = 5.0$
$r_3 = 2.4103$ (aspherical surface)
$\quad d_3 = 1.6 \quad n_2 = 1.56940$
$r_4 = -12.6998$ (aspherical surface)
$\quad d_4 = 2.023$
$r_5 = \infty$
$\quad d_5 = 1.2 \quad n_3 = 1.55322$ -continued $r_6 = \infty$
aspherical coefficient
3rd surface $\quad P = 0.0925, A_4 = 0.25544 \times 10^{-2}$
$\quad\quad\quad\quad A_6 = 0.26296 \times 10^{-4}, A_8 = -0.21224 \times 10^{-5}$
4th surface $\quad P = -27.7044, A_4 = 0.39632 \times 10^{-3}$ Embodiment 24
$f_0 = 3.70, f_c = 20.0, a = 3.34, d_0 = 19.5$
$r_1 = 150.0$
$\quad\quad\quad\quad d_1 = 2.0 \quad\quad n_1 = 1.82484$
$r_2 = -18.4235$
$\quad\quad\quad\quad d_2 = 5.0$
$r_3 = 2.4103$ (aspherical surface)
$\quad\quad\quad\quad d_3 = 1.6 \quad\quad n_2 = 1.56940$
$r_4 = -12.6998$ (aspherical surface)
$\quad\quad\quad\quad d_4 = 2.020$
$r_5 = \infty$
$\quad\quad\quad\quad d_5 = 1.2 \quad\quad n_3 = 1.55322$
$r_6 = \infty$
aspherical coefficient
3rd surface $\quad P = 0.0925, A_4 = 0.25544 \times 10^{-2}$
$\quad\quad\quad\quad A_6 = 0.26296 \times 10^{-4}, A_8 = -0.21224 \times 10^{-5}$
4th surface $\quad P = -27.7044, A_4 = 0.39632 \times 10^{-3}$ Embodiment 25
$f_0 = 3.60, f_c = 20.04, a = 3.26, d_0 = 19.3$
$r_1 = \infty$
$\quad\quad\quad\quad d_1 = 2.0 \quad\quad n_1 = 1.82484$
$r_2 = -16.527$
$\quad\quad\quad\quad d_2 = 8.0$
$r_3 = 2.1799$ (aspherical surface)
$\quad\quad\quad\quad d_3 = 1.8 \quad\quad n_2 = 1.49379$
$r_4 = -7.0033$ (aspherical surface)
$\quad\quad\quad\quad d_4 = 1.833$
$r_5 = \infty$
$\quad\quad\quad\quad d_5 = 1.2 \quad\quad n_3 = 1.55322$
$r_6 = \infty$
aspherical coefficient
3rd surface $\quad P = 0.0982, A_4 = 0.4468 = 10^{-2}$
$\quad\quad\quad\quad A_6 = 0.65331 \times 10^{-4}, A_8 = -0.21231 \times 10^{-5}$
4th surface $\quad P = -28.8561$ wherein the reference symbol $f_0$ represents focal length of the objective lens, the reference symbol $d_0$ designates distance reserved between the light source and the collimater lens, the reference symbols $r_1, r_2, \ldots$ denote radii of curvature on the respective lens surfaces, the reference symbols $d_1, d_2, \ldots$ represent thicknesses of the respective lenses, and the reference symbols $n_1, n_2, n_3, \ldots$ designates refractive indices of the respective lenses for a ray having a wavelength of 780 nm.

When the objective lens is designed as a graded refractive index lens in the Embodiments described above, its refractive index is expressed by the following formula:

$$n(y) = n_0 \sqrt{1 - (gy)^2 + h_4(gy)^4 + h_6(gy)^6 + h_8(gy)^8}$$

wherein the reference symbol $n_0$ represents refractive index at the center of the lens and the reference symbol g designates a coefficient expressing refractive index gradient.

Figure 3:
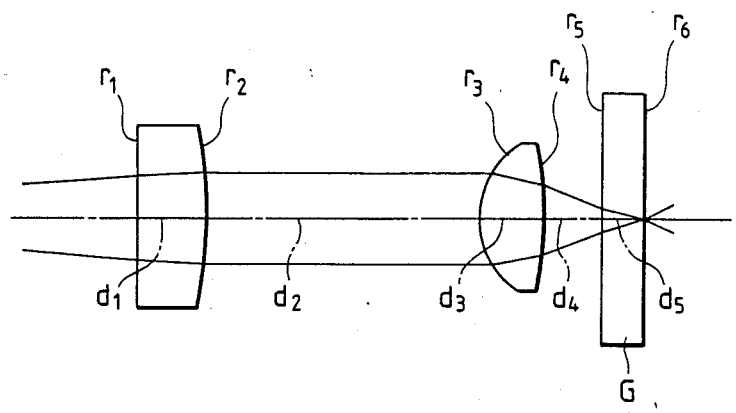
FIG. 3 shows a sectional view illustrating composition of the imaging optical system for the optical memory device according to the present invention.
Figure 4:
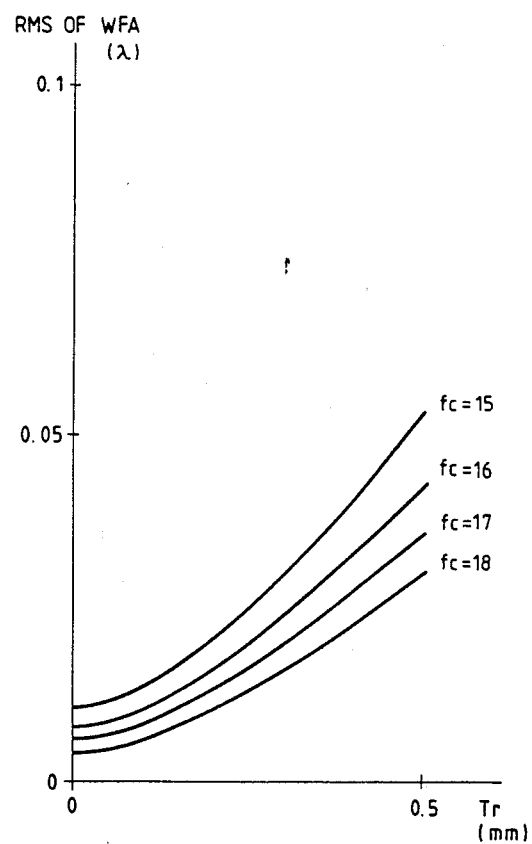
FIG. 4 shows a graph illustrating relationship between focal length of the collimator lens and the wave front aberration in the imaging optical system in Embodiment 15 of the present invention.
Figure 5:
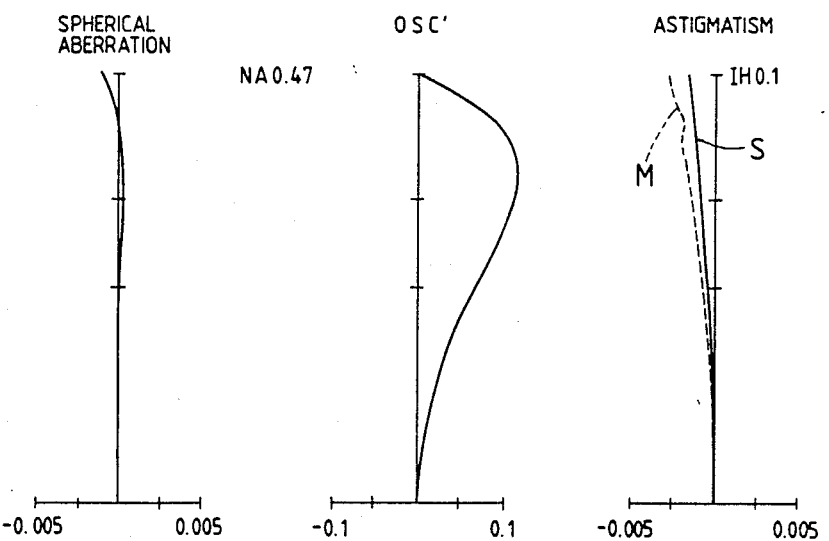
FIG. 5 through FIG. 19 show curves illustrating aberration characteristics of Embodiment 1 through 15 of the present invention.
Figure 6:
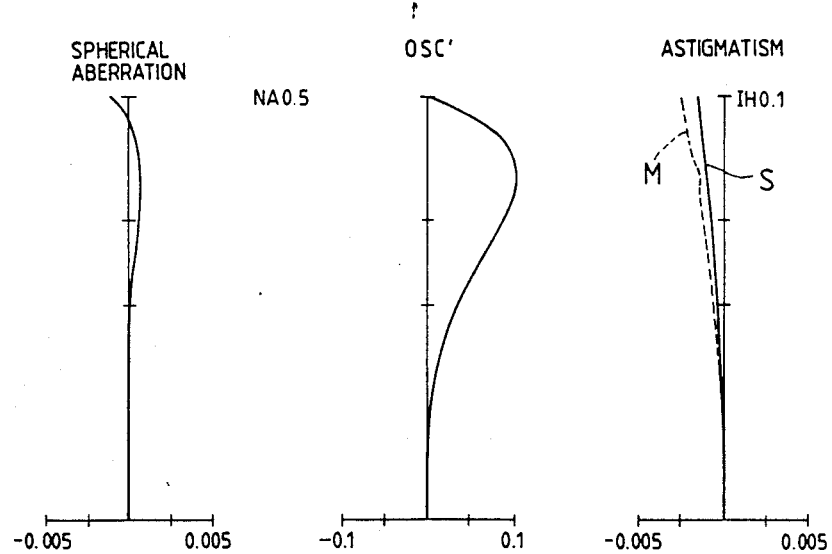
Figure 7:
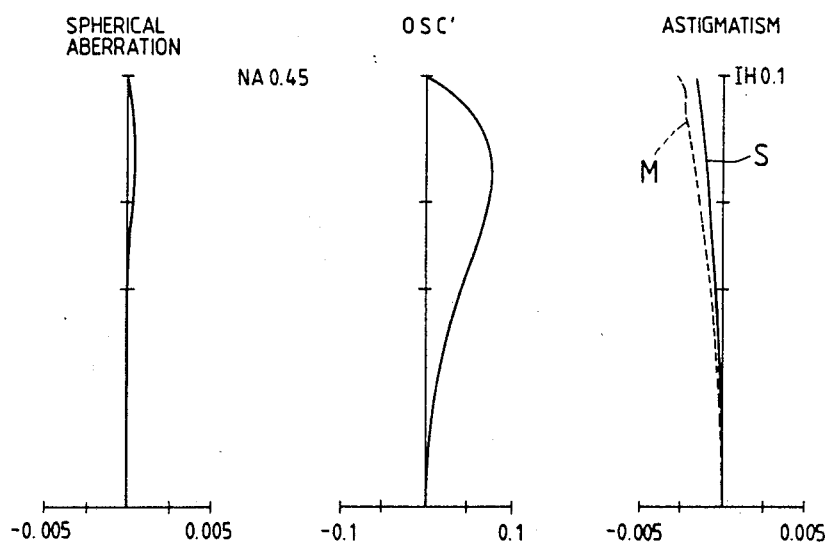
Figure 8:
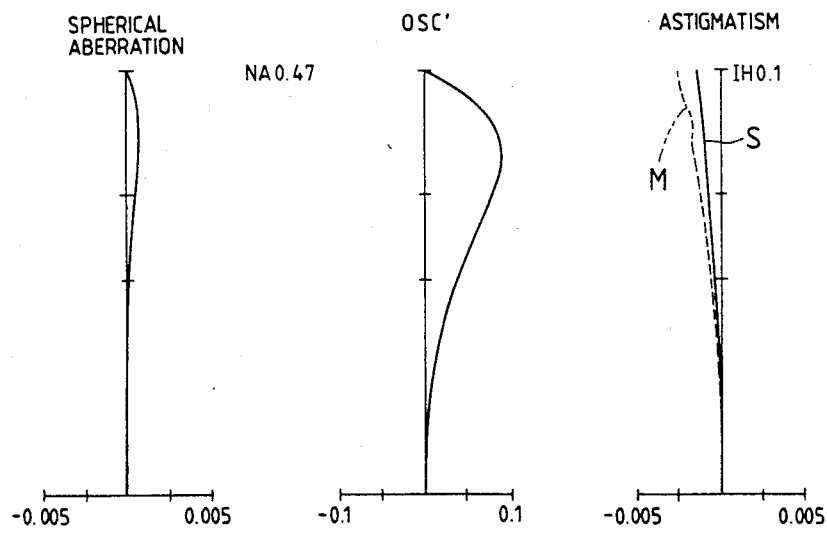
Figure 9:
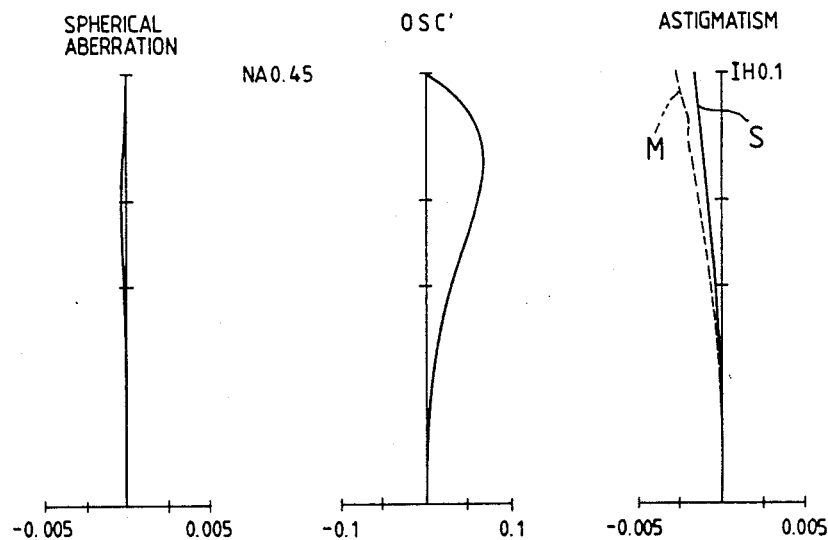
Figure 10:
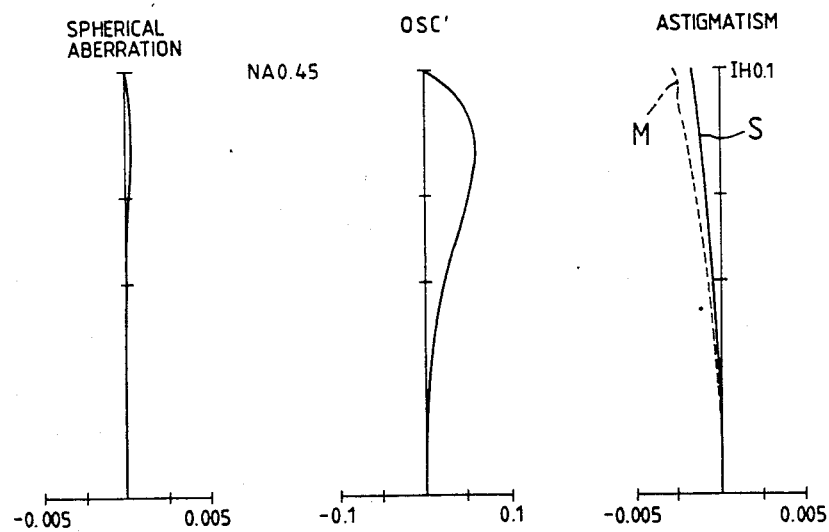
Figure 11:
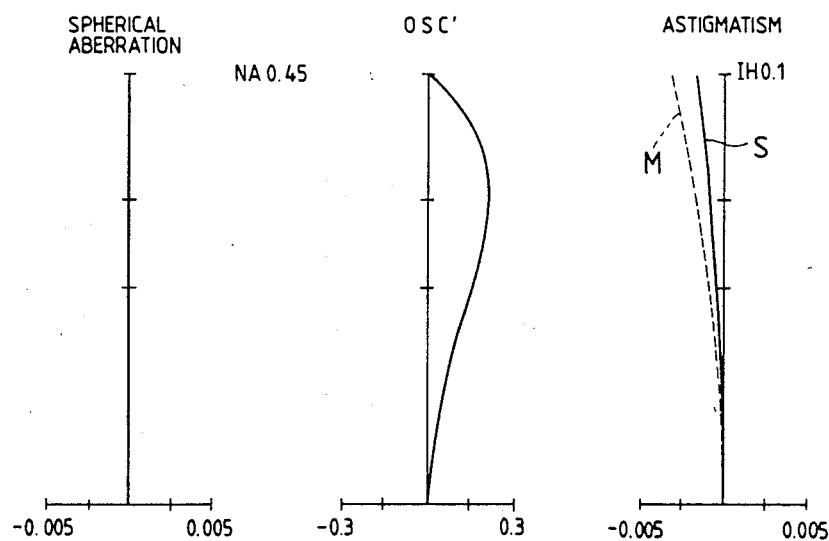
Figure 12:
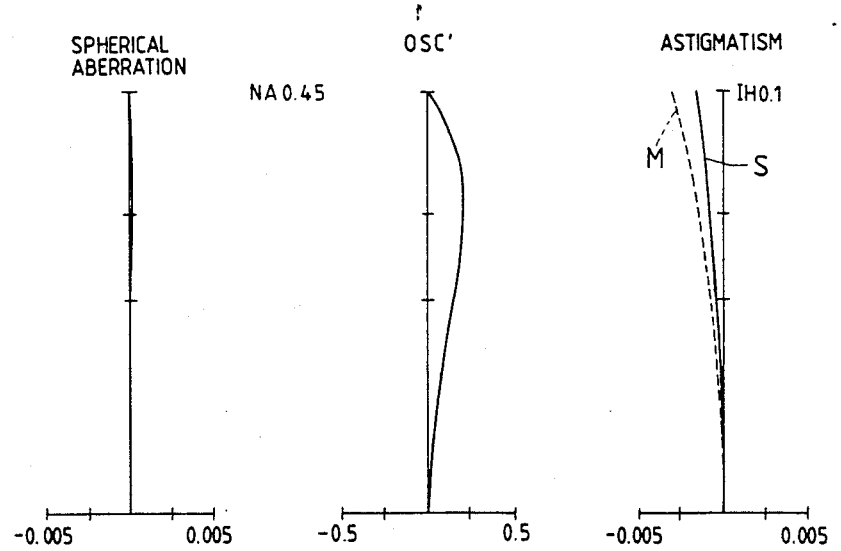
Figure 13:
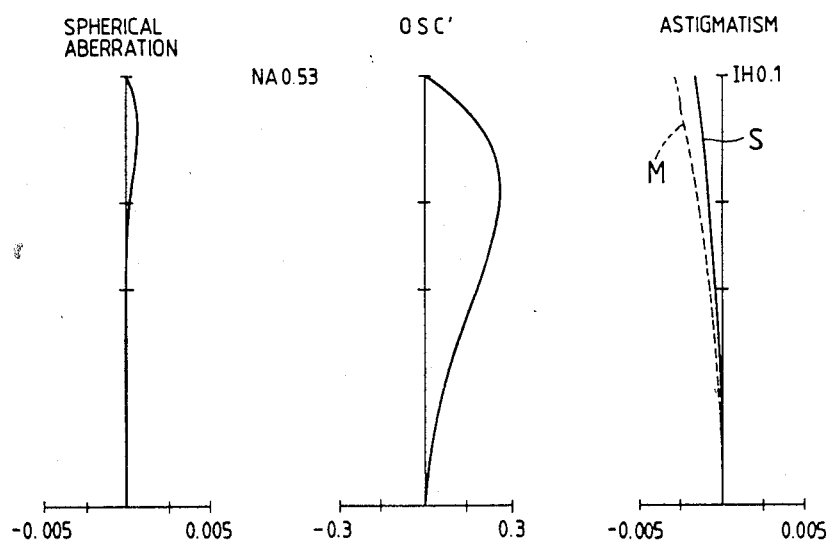
Figure 14:
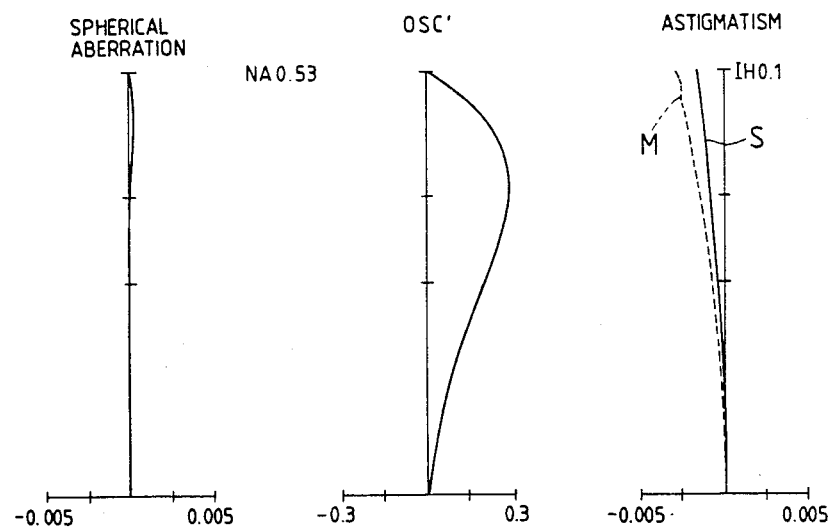
Figure 15:
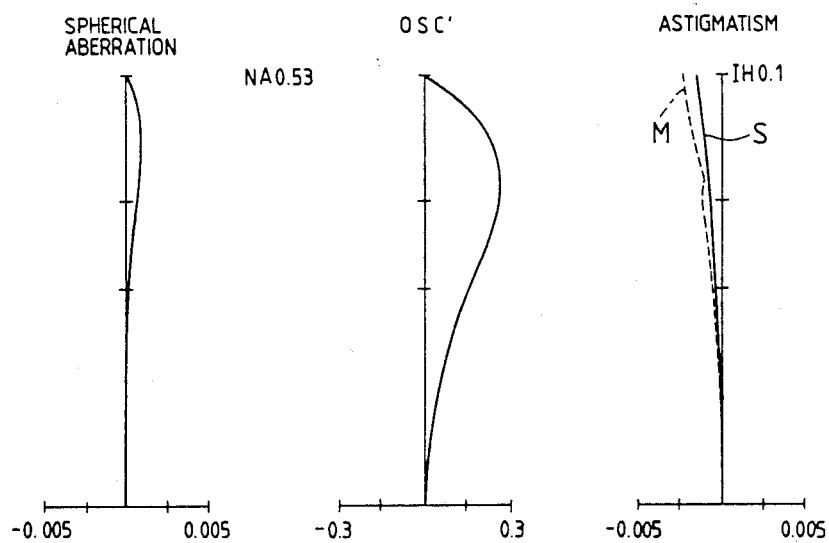
Figure 16:
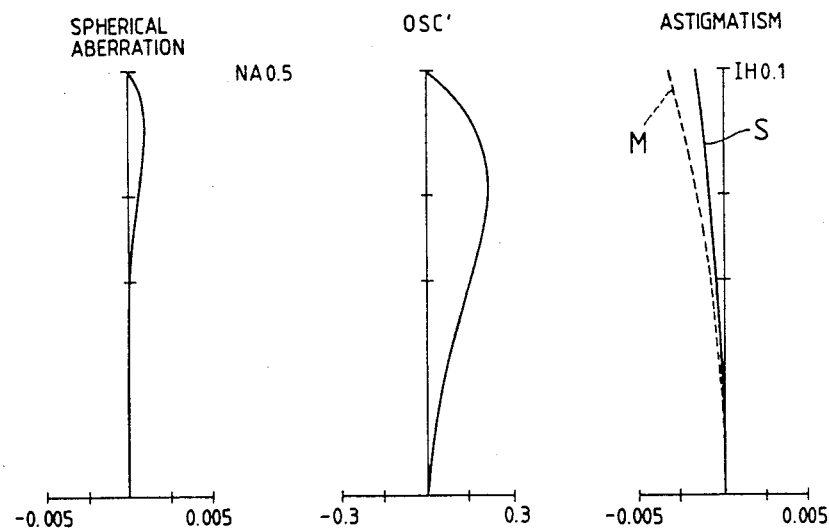
Figure 17:
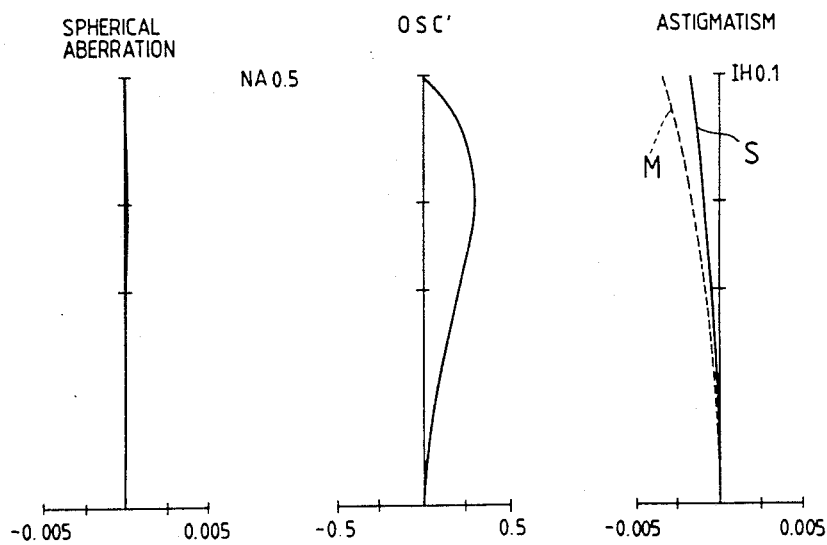
Figure 18:
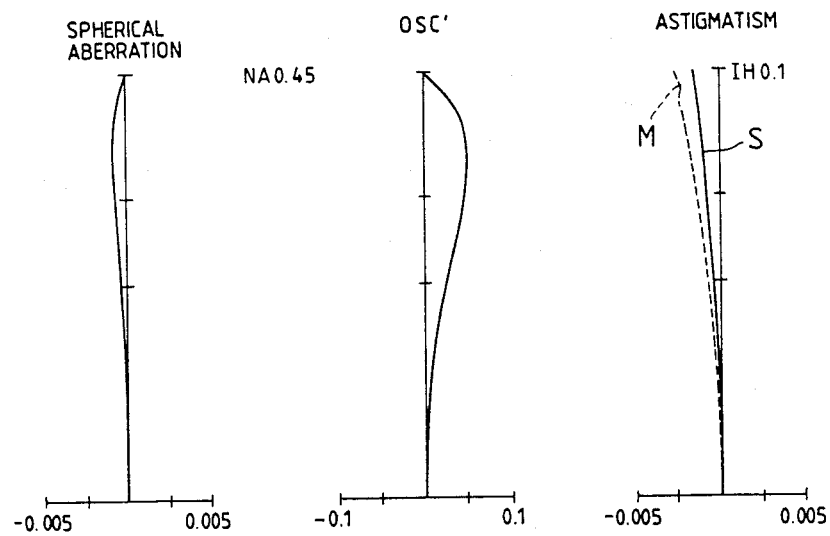
Figure 19:
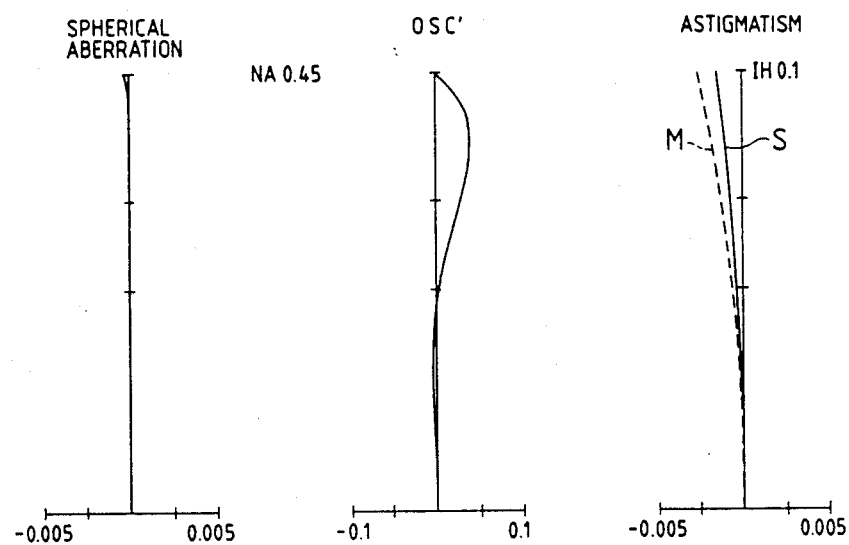
Figure 22:
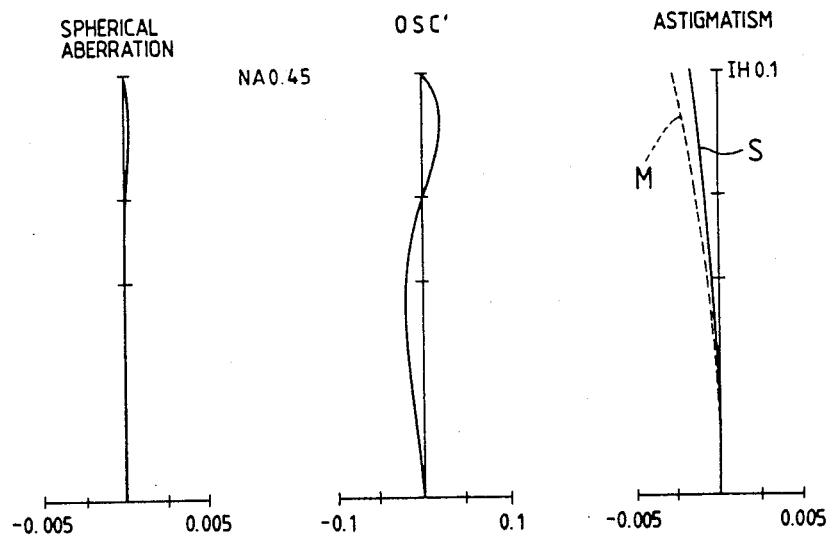
FIG. 22 and FIG. 23 show curves illustrating aberration characteristics of the Embodiment 16 of the present invention.
Figure 23:
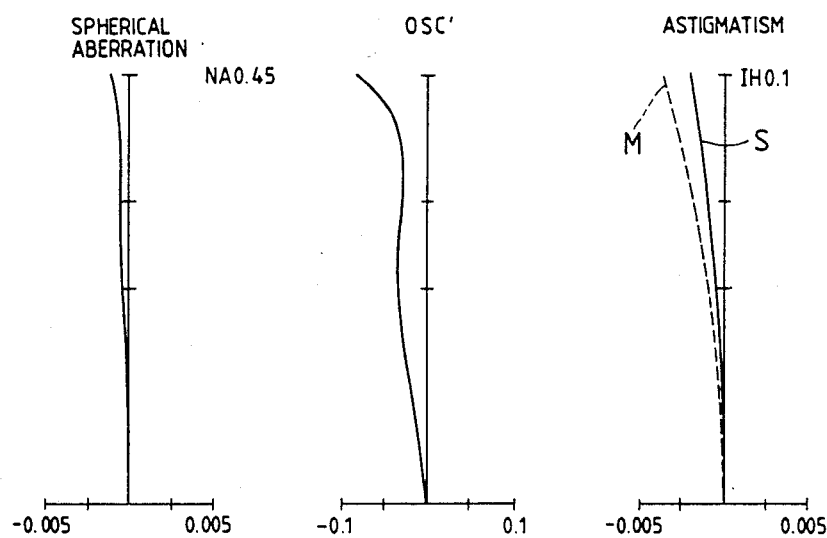
Figure 24:
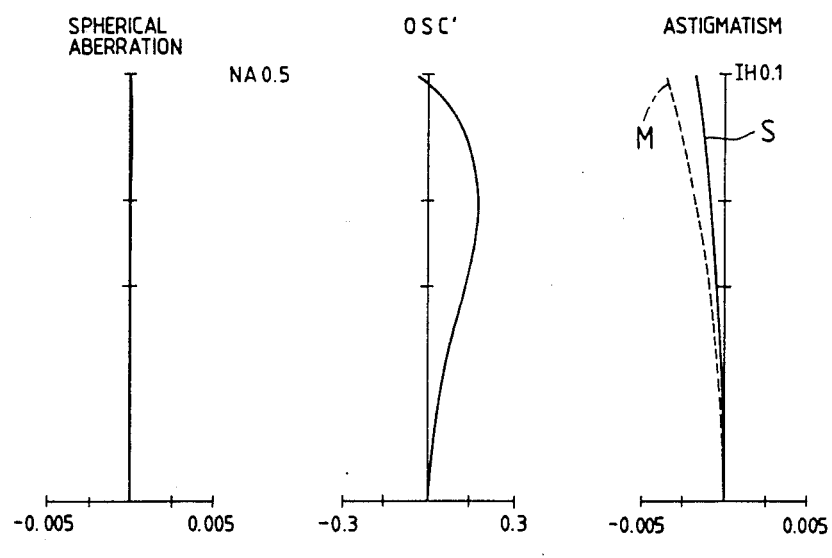
FIG. 24 and FIG. 25 show curves illustrating aberration characteristics of the Embodiment 17 of the present invention.
Figure 25:
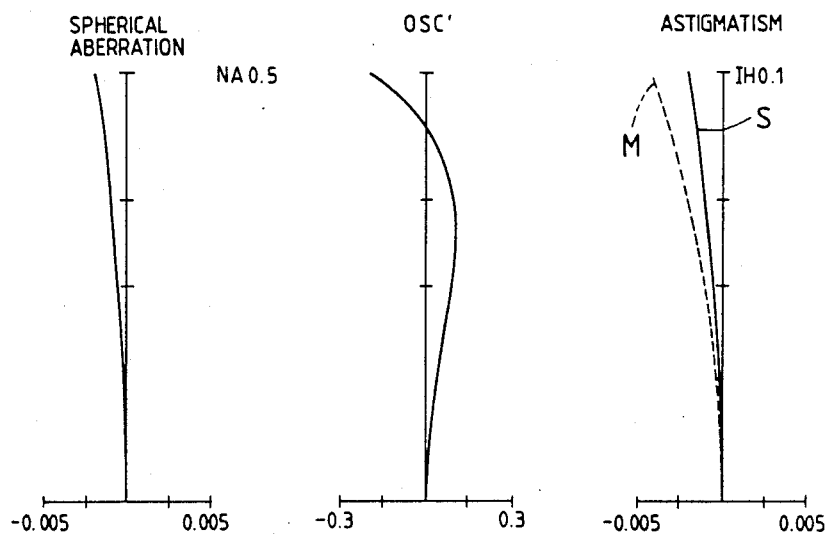
Figure 26:
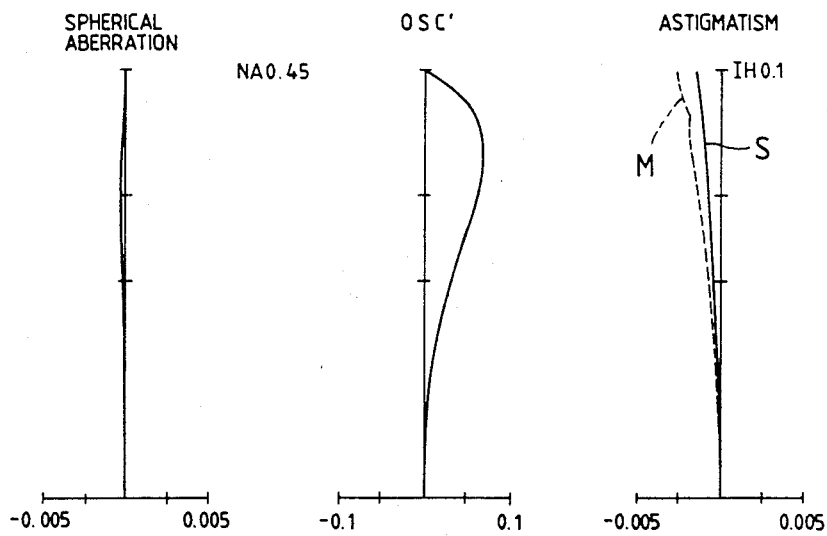
FIG. 26 and FIG. 27 show curves illustrating aberration characteristics of Embodiment 18 of the present invention.
Figure 27:
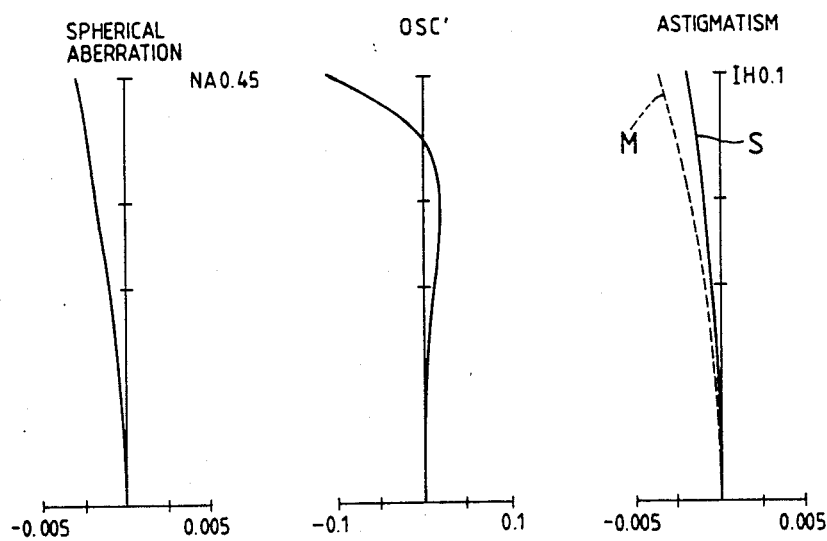
Figure 28:
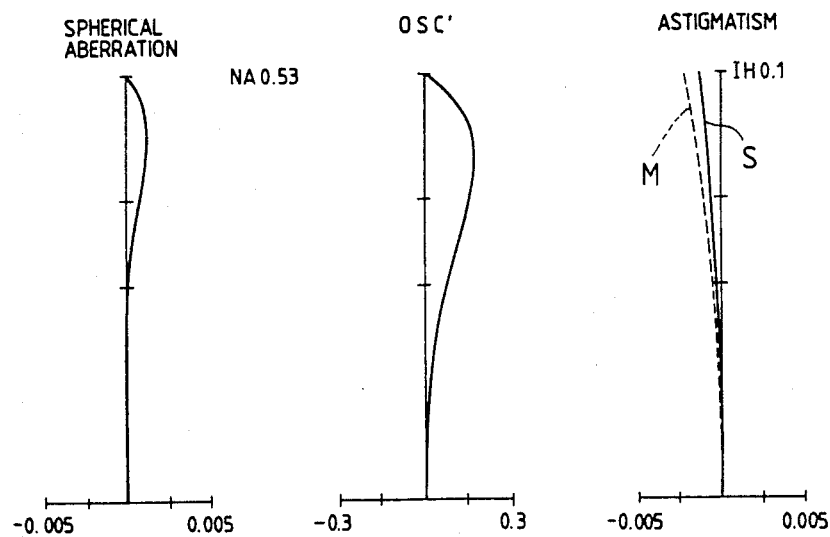
FIG. 28 and FIG. 29 show curves illustrating aberration characteristics of Embodiment 19 of the present invention.
Figure 29:
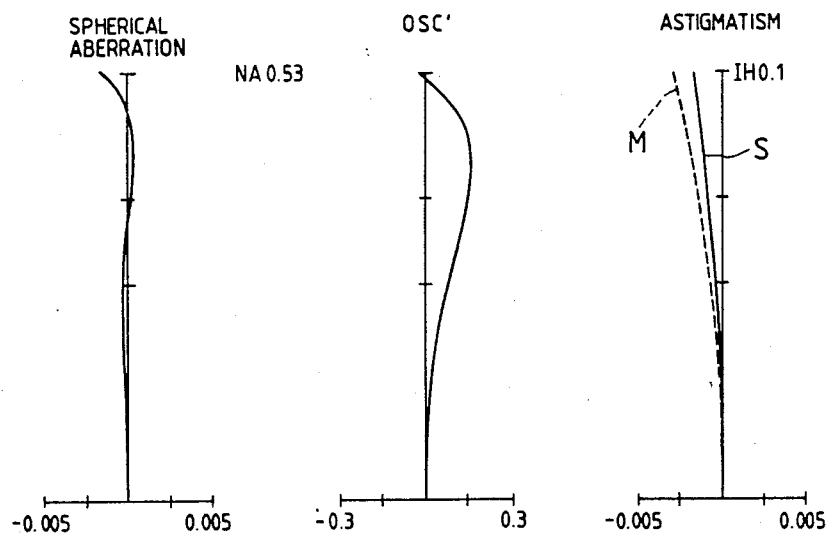
Figure 30:
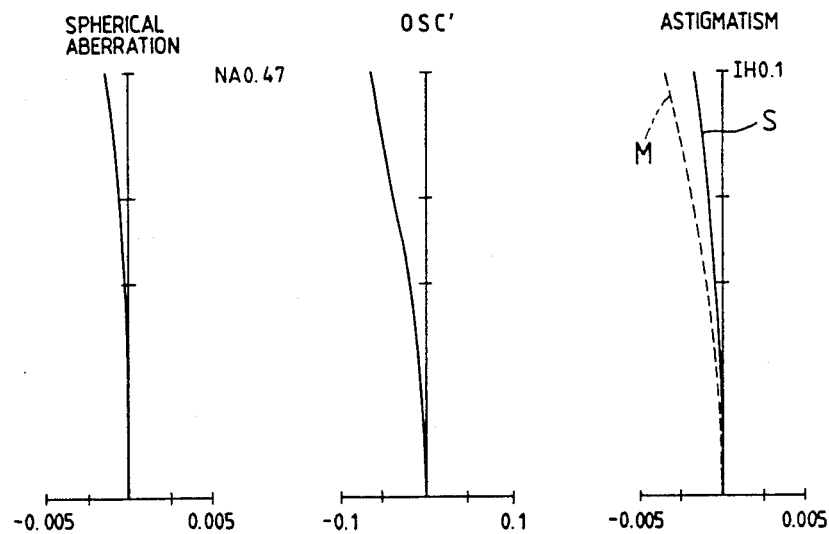
FIG. 30 and FIG. 31 show curves illustrating aberration characteristics of Embodiment 20 of the present invention.
Figure 31:
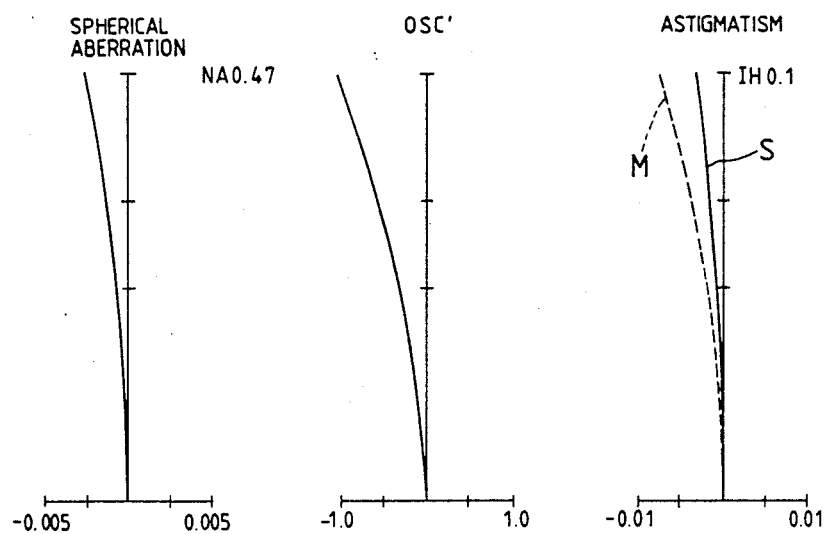
Figure 32:
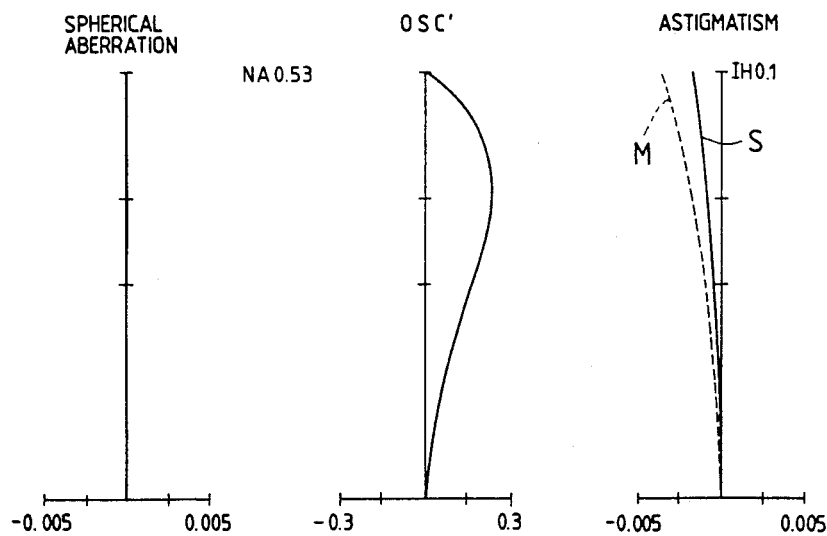
FIG. 32 and FIG. 33 show curves illustrating aberration characteristics of Embodiment 21 of the present invention.
Figure 33:
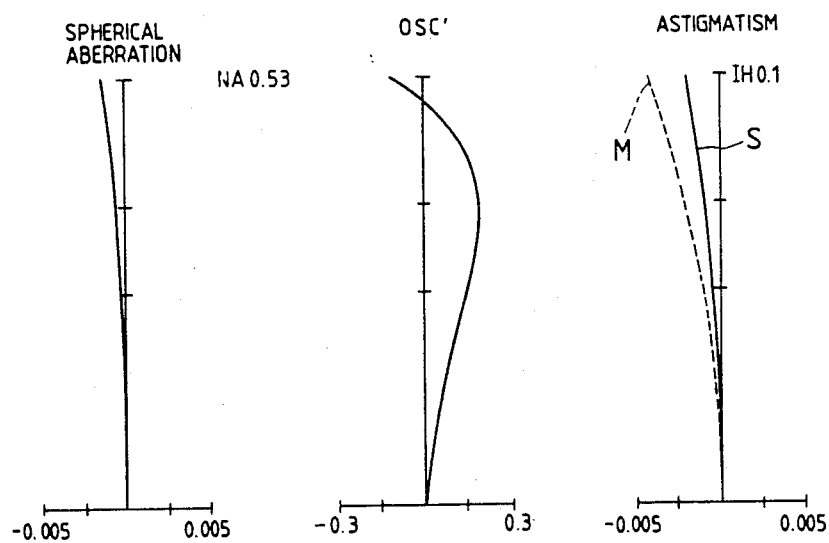
Figure 34:
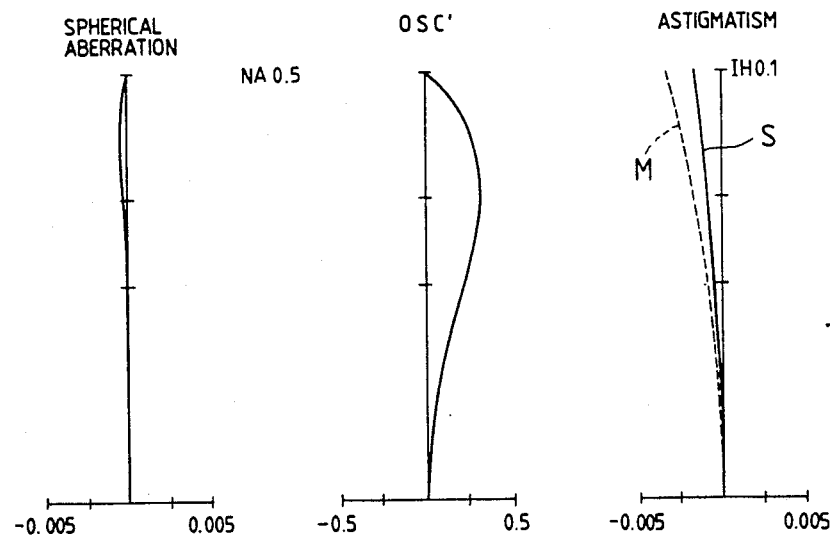
FIG. 34 and FIG. 35 show graphs illustrating aberration characteristics of Embodiment 22 of the present invention.
Figure 35:
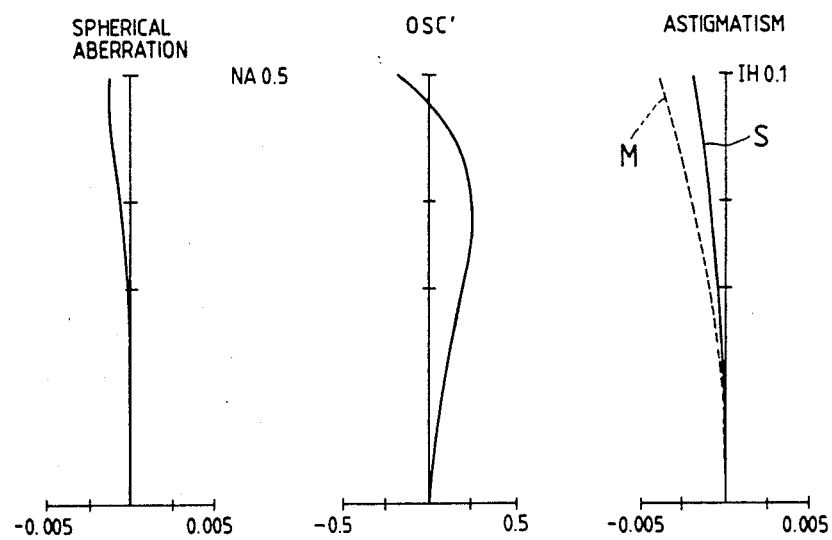
Figure 36:
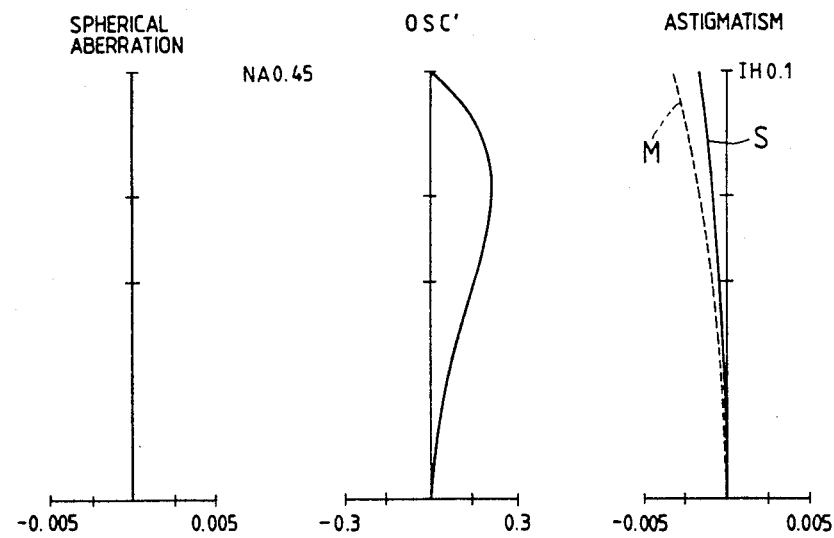
FIG. 36 and FIG. 37 show graphs illustrating aberration characteristics of Embodiment 23 of the present invention.
Figure 37:
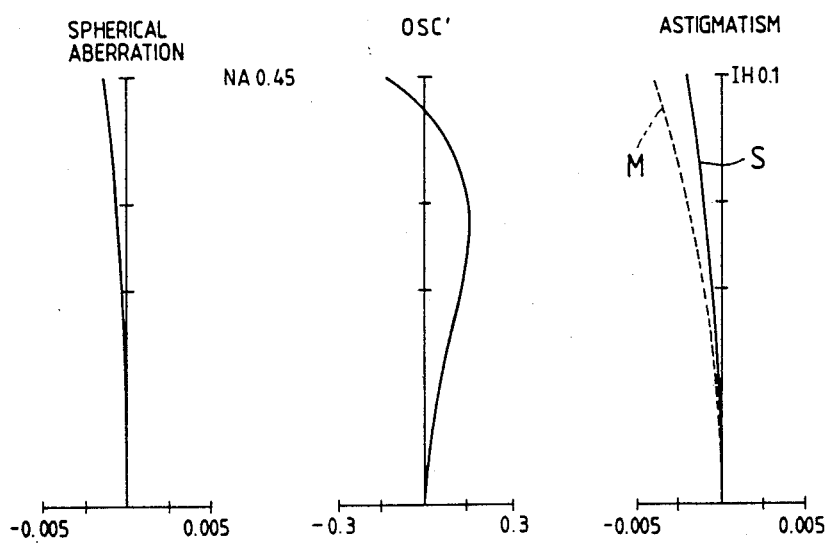
Figure 38:
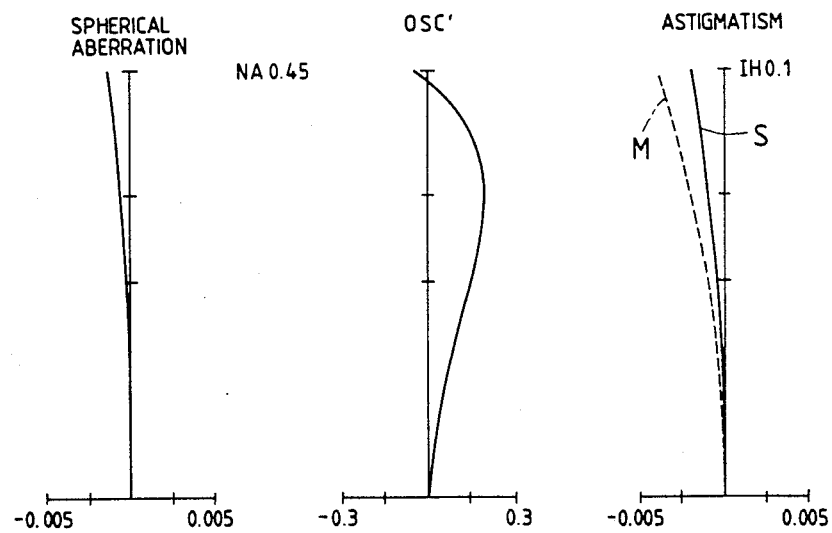
FIG. 38 shows graphs illustrating aberration characteristics of Embodiment 24 of the present invention.
Figure 39:
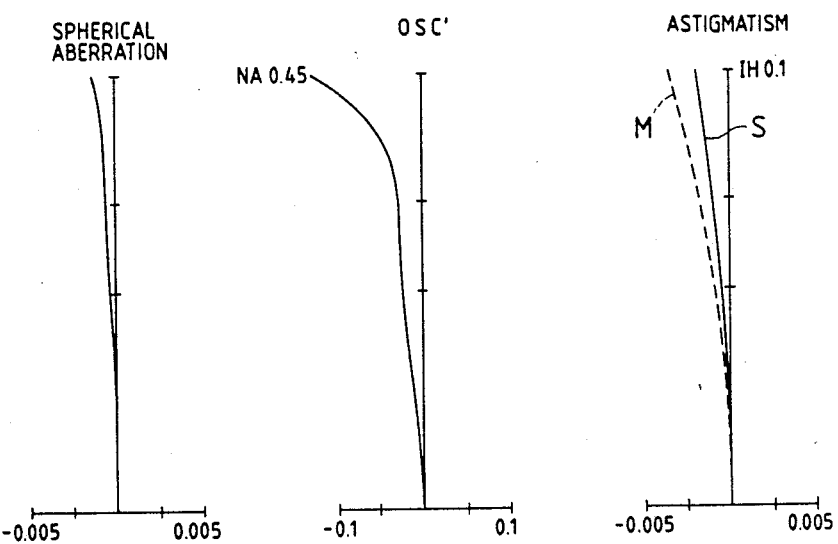
FIG. 39 shows graphs illustrating aberration characteristics of Embodiment 25 of the present invention.
Figure 40:
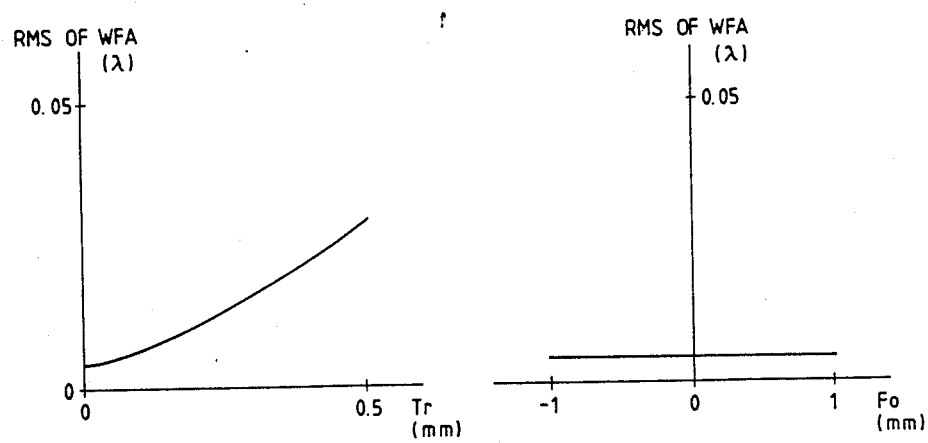
Figure 41:
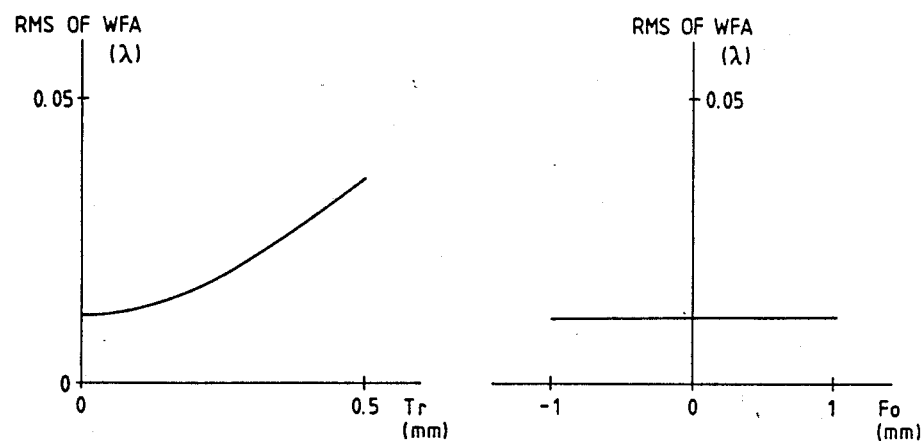
Figure 42:
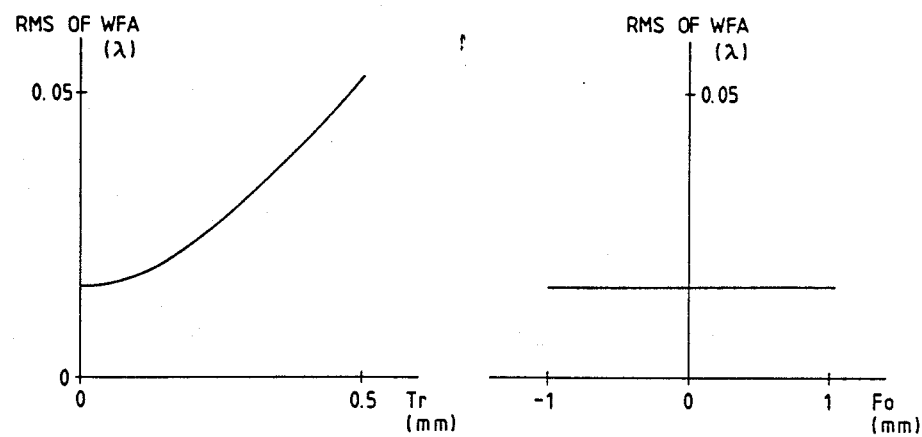
Figure 43:
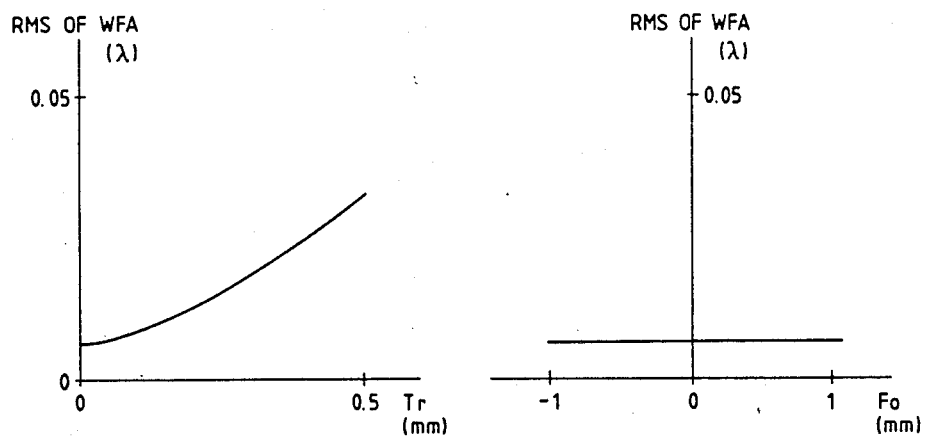
Figure 44:
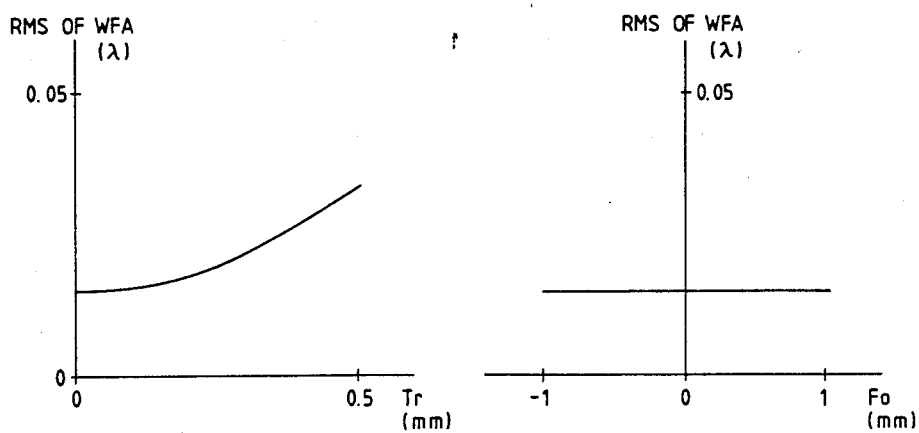
Figure 45:
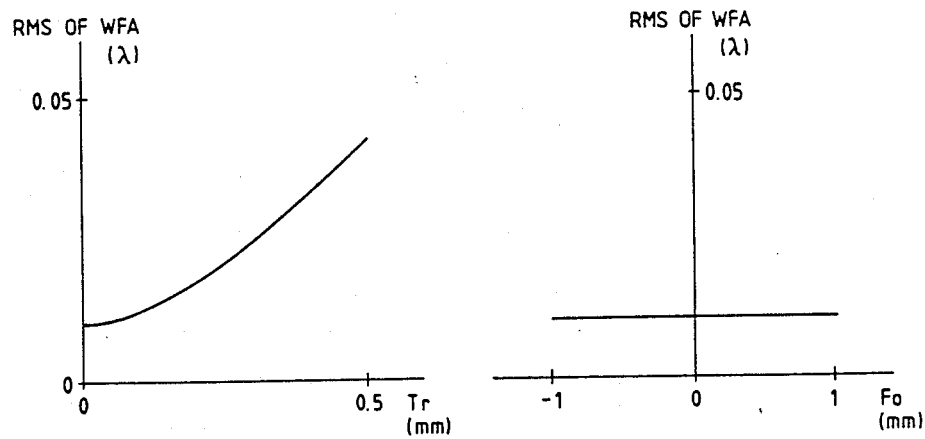
Figure 46:
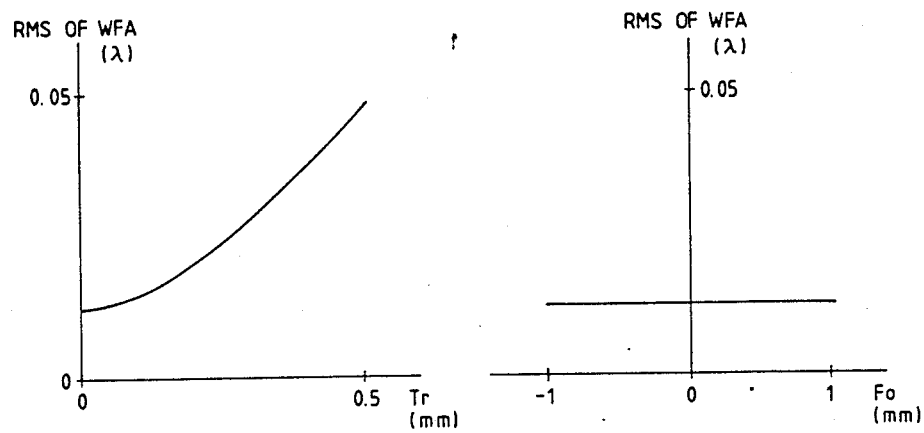
Figure 47:
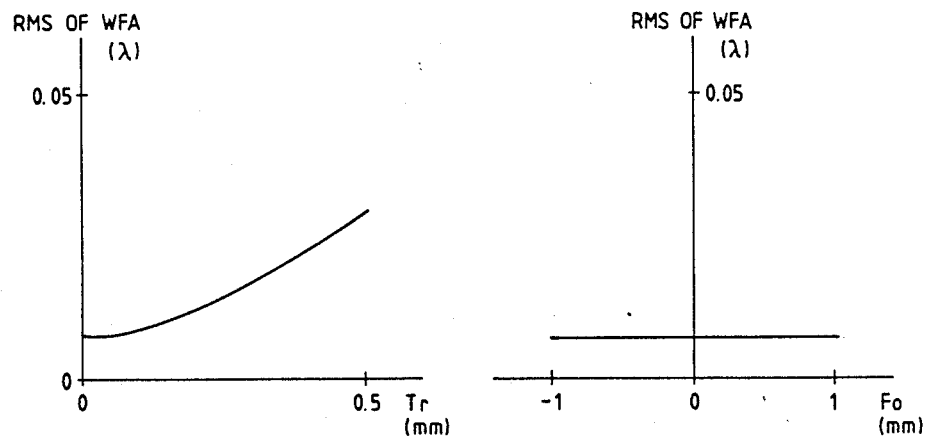
Figure 48:
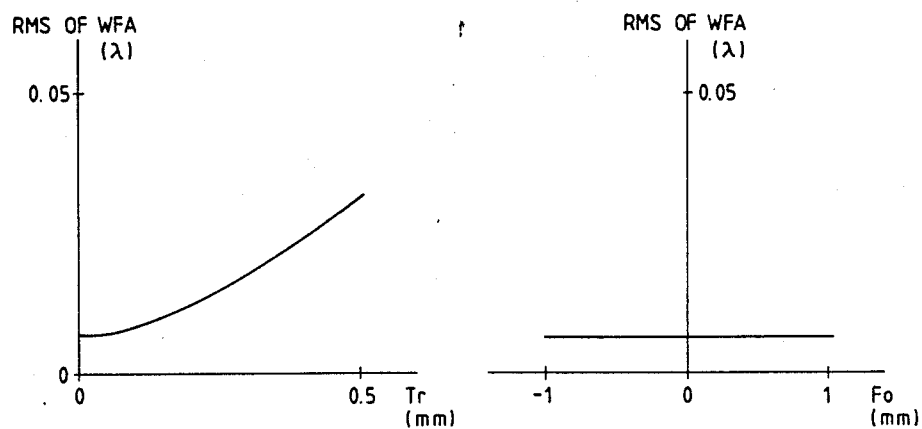

These Embodiments have the composition shown in FIG. 3 and the aberration characteristics illustrated in FIG. 22 through FIG. 38. Speaking concretely, FIG. 22 and FIG. 23 illustrate the aberration characteristics of the objective lens only and those of the imaging optical system as a whole of the Embodiment 16, FIG. 24 and FIG. 25 show the aberration characteristics of the objective lens only and those of the imaging optical system as a whole of the Embodiment 17, FIG. 26 and FIG. 27 show the aberration characteristics of the objective lens only and those of the imaging optical system as a whole of the Embodiment 18, FIG. 28 and FIG. 29 illustrate the aberration characteristics of the objective lens only and the imaging optical system as a whole of the Embodiment 19, FIG. 30 and FIG. 31 visualize the aberration characteristics of the objective lens only and those of the imaging optical system as a whole of the Embodiment 20, FIG. 32 and FIG. 33 visualize the aberration characteristics of the objective lens only and those of the imaging optical system as a whole of the Embodiment 21, FIG. 34 and FIG. 35 show the aberration characteristics of the objective lens only and those of the imaging optical system as a whole of the Embodiment 22, FIG. 36 and FIG. 37 show aberration characteristics of the objective lens only and those of the imaging optical system as a whole of the Embodiment 23, FIG. 38 illustrates the aberration characteristics of the imaging optical system as a whole of the Embodiment 24, and FIG. 39 illustrates the aberration characteristics of the imaging optical system as a whole of the Embodiment 25 The objective lens used in the imaging optical system of the Embodiment 24 is the same as the objective lens adopted in the Embodiment 23. The objective lens used in the imaging optical system of the Embodiment 25 is the same as the objective lens described as the Embodiment 15.

Root Mean Square (both in the tracking direction and the direction along the optical axis) of wave front aberration in the imaging optical system in each of the Embodiments is visualized in FIG. 40 through FIG. 49.

As is apparent from the aberration characteristics illustrated in these drawings, each of the Embodiments has favorable imaging performance.

Owing to the facts that the objective lens for the optical memory device according to the present invention has the aspherical surfaces on both the sides thereof and that it is so designed as to satisfy the conditions (1) through (4), it has a large numerical aperture, a compact form, favorably corrected aberrations and a shape easily obtainable by machining.

Further, the imaging optical system for the optical memory device according to the present invention has a simple composition consisting of a single-element lens having aspherical surfaces and an objective lens, allows performance thereof to be degraded very little by shifting the objective lens, and is manufacturable at a low cost.

I claim:

1. An objective lens for an optical memory device designed as a single-element lens having a first aspherical surface and a second aspherical surface expressed by the formula shown below when the direction along the optical axis is taken as the x axis and the direction perpendicular to the optical axis is taken as the y axis:

$$x = \frac{y^2/r}{1 + \sqrt{1 - P(y/r)^2}} + \sum_{i=1}^{} A_{2i} y^{2i}$$

wherein the reference symbol r represents radius of curvature on the vertex of the aspherical surface, the reference symbol P designates the conic constant and the reference symbol $A_{2i}$ denotes the coefficient of aspherical surface of the 2i'th order, and so designed as to satisfy the following conditions (1) through (4):
(1) n < 1.65
(2) 0.25 < d/nf < 0.4
(3) $-0.5 < P_1 < 0.5$
(4) $P_2 < -20$ wherein the reference symbol n represents refractive index of the objective lens, the reference symbol f designates focal length of the objective lens, the reference symbol d denotes thickness of the objective lens, and the reference symbols $P_1$ and $P_2$ represent the conic constants of the first surface and the second surface respectively.

2. An imaging optical system for an optical memory device comprising, in the order from the side of the light source, a collimator lens designed as a single-element lens having spherical surfaces and an objective lens, and so designed as to satisfy the following conditions, said objective lens being movable at least in the direction along the optical axis:

(5) $3 \leq a \leq 4.1$
(6) $15 \leq f_c \leq 24$ wherein the reference symbol a represents diameter of the entrance pupil of said objective lens and the reference symbol $f_c$ designates focal length of said collimator lens.

3. An imaging optical system for an optical memory device according to claim 2 wherein at least one of the surfaces of said objective lens is designed as an aspherical surface.

4. An imaging optical system for an optical memory device according to claim 2 wherein said objective lens is designed as a graded refractive index lens.

* * * * *